United States Patent
Mizue

(10) Patent No.: US 6,239,427 B1
(45) Date of Patent: May 29, 2001

(54) OPTICAL DATA LINK

(75) Inventor: Toshio Mizue, Kanagawa (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/203,767

(22) Filed: Dec. 2, 1998

(30) Foreign Application Priority Data

Jan. 14, 1998 (JP) .................................. 10-005737
Nov. 20, 1998 (JP) .................................. 10-331210

(51) Int. Cl.⁷ ........................................... G02B 6/43
(52) U.S. Cl. .......................... 250/239; 385/88; 385/94
(58) Field of Search ...................... 250/227.11, 214 R, 250/216, 239; 385/88, 89, 90, 91, 92, 93, 94

(56) References Cited

U.S. PATENT DOCUMENTS

| | | |
|---|---|---|
| 4,410,469 | 10/1993 | Katagiri et al. . |
| 4,539,476 | 9/1985 | Donuma et al. . |
| 4,911,519 | * 3/1990 | Burton et al. . |
| 5,113,466 | * 5/1992 | Acarlar et al. ......................... 385/88 |
| 5,127,071 | * 6/1992 | Go ......................................... 385/73 |
| 5,295,214 | * 3/1994 | Card et al. ............................. 385/92 |
| 5,475,783 | 12/1995 | Kurashima . |
| 5,596,665 | * 1/1997 | Kurashima et al. ................... 385/92 |
| 5,661,835 | * 8/1997 | Kato et al. ............................. 385/92 |
| 5,742,480 | * 4/1998 | Sawada et al. ....................... 361/749 |
| 5,784,513 | * 7/1998 | Kuribayashi et al. ................. 385/88 |
| 5,963,693 | * 10/1999 | Mizue et al. .......................... 385/88 |

* cited by examiner

Primary Examiner—John R. Lee
(74) Attorney, Agent, or Firm—McDermott, Will & Emery

(57) ABSTRACT

A housing for mounting a subassembly having outer lead pins, which is an optical module having a light-receiving device or light-emitting device, is configured such that the outer lead pins are positioned and secured at their predetermined positions while penetrating through the housing, thereby yielding a structure for easily assembling the subassembly, while the configuration of the housing and its manufacturing process are simplified. The structure for positioning by penetration includes a through hole having securing means, guide grooves provided so as to correspond to the respective outer lead pins, and the like. Also, an electric shield can be constructed when the housing is provided with conductive plating, a thin metal sheet, and the like.

18 Claims, 24 Drawing Sheets

OPTICAL DATA LINK

BACKGROUND OF THE INVENTION

1. Field of the Invention

The present invention relates to an optical data link equipped with an optical module incorporating a light-emitting device or a light-receiving device therein.

2. Related Background Art

Conventionally known as an optical link of such a kind is the one configured as shown in FIG. 27. This optical data link has a configuration in which an optical module A comprising a light-emitting device, a light-receiving device, and an electronic circuit for driving and controlling these optical devices, and so forth are assembled into an optical receptacle B for mating with an optical connector. In the optical module A, an optical device mounting section C for mounting the light-emitting device and light-receiving device, and a circuit mounting section D for mounting the electronic circuit are integrally molded by resin encapsulation.

Here, in the optical device mounting section C, the light-emitting device and the light-receiving device are separately assembled in their respective alignment sleeves E, F made of a metal, and optical axis alignment is made beforehand between these devices and optical fibers while actually establishing electric conduction therebetween. In the circuit mounting section D, an insulating substrate, in which a wiring pattern is provided, is mounted on inner leads formed on a lead frame, and an active element such as integrated circuit (IC) and a passive element such as capacitor or resistor are connected to the wiring pattern, such as to constitute the electronic circuit, while the wiring pattern is electrically connected to the inner leads and to a plurality of outer lead pins G extending from the lead frame. Then, as mentioned above, when the optical device mounting section C equipped with the alignment sleeves E, F and the circuit mounting section D are encapsulated with a resin, then the optical module A is formed. When the optical module A is assembled into the optical receptacle B on its rear end side, then the optical data link is constructed.

SUMMARY OF THE INVENTION

Since the alignment sleeves made of a metal are expensive, it has been difficult for the conventional optical data link to cut down its cost. Further, the process for manufacturing the optical module has been complicated in that the light-emitting device and light-receiving device are assembled while aligning with their alignment sleeves in terms of optical axes, electronic components such as active devices and passive devices are connected to a wiring pattern of an insulating substrate, the insulating substrate is mounted on a lead frame and provided with electric wiring, and then the individual sections are collectively encapsulated with a resin.

Also, since each of the outer lead pins G is bent at an angle greater than 90°, their installation becomes difficult when the number of pins is large or when pins are arranged in a plurality of rows. Therefore, it has been necessary to prepare separate parts, for example, such as a jig for aligning the outer lead pins G and inserting them into substrate holes, or a sub-substrate H having round pins vertically extending therefrom which is used for mounting the outer lead pins G so that the latter are installed with the aid of the sub-substrate H.

In view of such problems of the prior art, it is an object of the present invention to provide an optical data link having a configuration which can simplify its manufacturing process and enables the optical module to attach thereto easily.

In order to overcome the above-mentioned problems, the optical data link in accordance with the present invention comprises a housing; and a communication subassembly, attached to the housing, having an optical device, wherein the housing is configured such that a plurality of outer lead pins provided in the communication subassembly are secured as being positioned while penetrating through the housing at predetermined positions.

When the housing is thus configured such that the outer lead pins of the communication subassembly, which is an optical module having an optical device, penetrate through predetermined parts such as holes or grooves formed in the housing and are secured as being positioned at these parts, then the configuration and manufacturing process of the housing can be simplified, and the housing can attain a structure which allows the subassembly to be easily assembled thereto.

The communication subassembly encompasses a receiving subassembly having a light-receiving device and a transmitting subassembly having a light-emitting device.

Since such a subassembly is molded by resin encapsulation, its electronic circuit is not electrically shielded, whereby resistance to noise is desired to be improved. When the housing or a member included in the housing is employed to attain a configuration in which the subassembly is covered with conductive plating, a thin metal sheet, or the like, by contrast, then it can yield an excellent resistance to noise as an electric shield for the subassembly.

The present invention can more fully be understood from the detailed description given hereinafter and the accompanying drawings. It should be noted, however, that they are given by way of illustration only and thus are not limitative of the present invention.

Further scope of applicability of the present invention will come apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
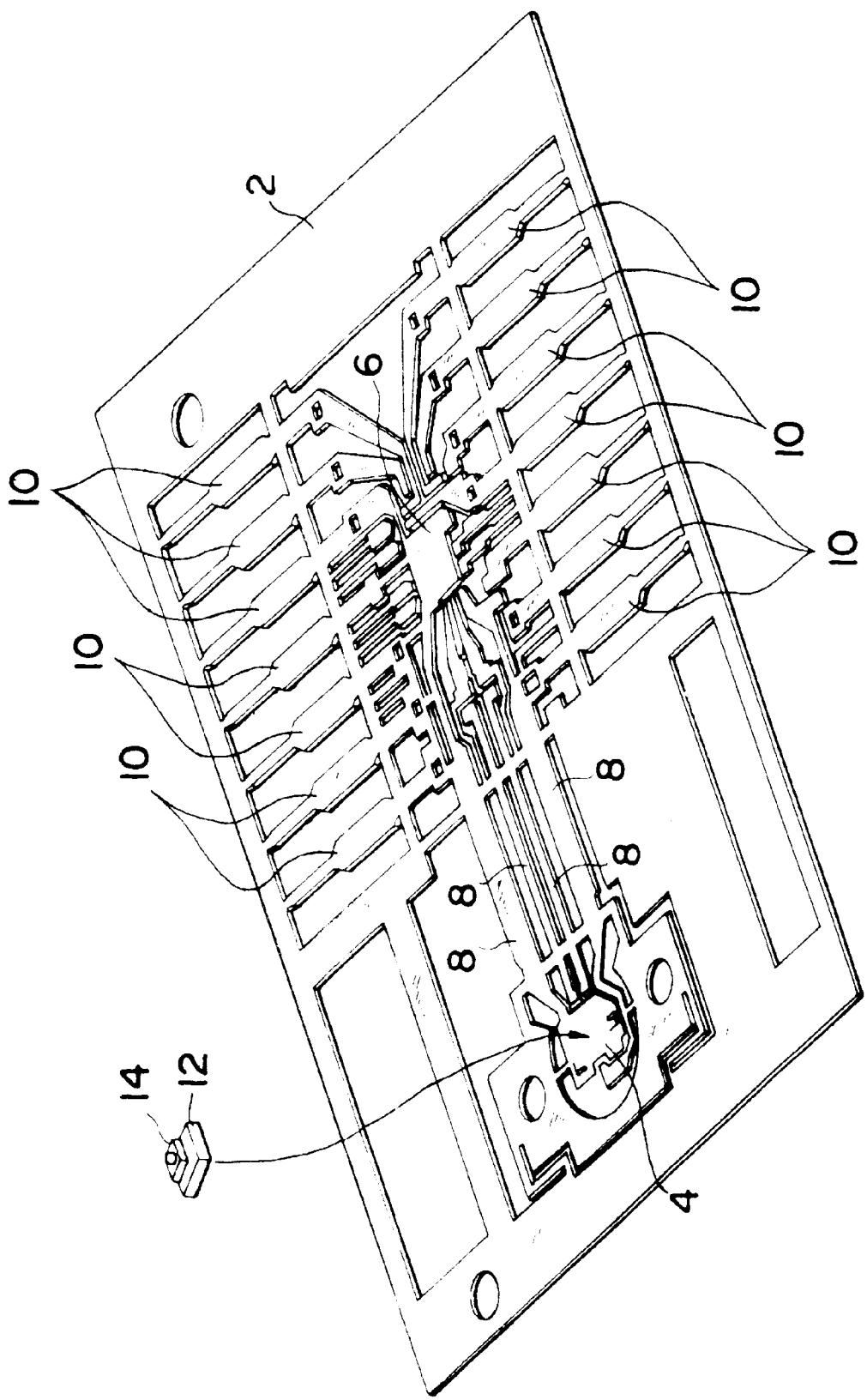
FIG. 1 is a perspective view showing a configuration of a lead frame for forming a receiving subassembly.

In the following, preferred embodiments of the present invention will be explained with reference to the accompanying drawings. For easier understanding of the explanation, constituents identical to each other among the drawings will be referred to with reference numerals identical to each other whenever possible, without repeating their overlapping descriptions. In the drawings, shapes and dimensions of constituents are partly exaggerated for their explanations and do not always coincide with those in practice.

First, with reference to FIGS. 1 to 4, the configuration of a receiving subassembly Rx, which is an optical module having a light-receiving device, will be explained together with its manufacturing process.

For the receiving subassembly Rx, a lead frame 2, made of a metal, having a configuration shown in FIG. 1 is used.

The lead frame 2 is formed with an optical device mounting section 4 for mounting an optical device, an electronic device mounting section 6 for mounting an electronic device, 4 inner lead pins 8 for electrically and mechanically connecting the mounting sections 4, 6 to each other, and 14 outer lead pins 10 located on both sides of the electronic device mounting section 6.

Via a sub-mount member 12, an optical device 14 in the form of a semiconductor chip (bare chip) is secured onto the optical device mounting section 4, whereas an electronic device for processing an electric signal outputted from the optical device 14 is installed on the electronic device mounting section 6. Here, as the sub-mount member 12, a parallel type capacitor (Die Capacitance) or the like is used, whereas a light-receiving device such as InGaAs-PIN type photodiode sensitive to an optical signal in the 1.3-$\mu$m wavelength band or the like is employed as the optical device 14.

Figure 2:
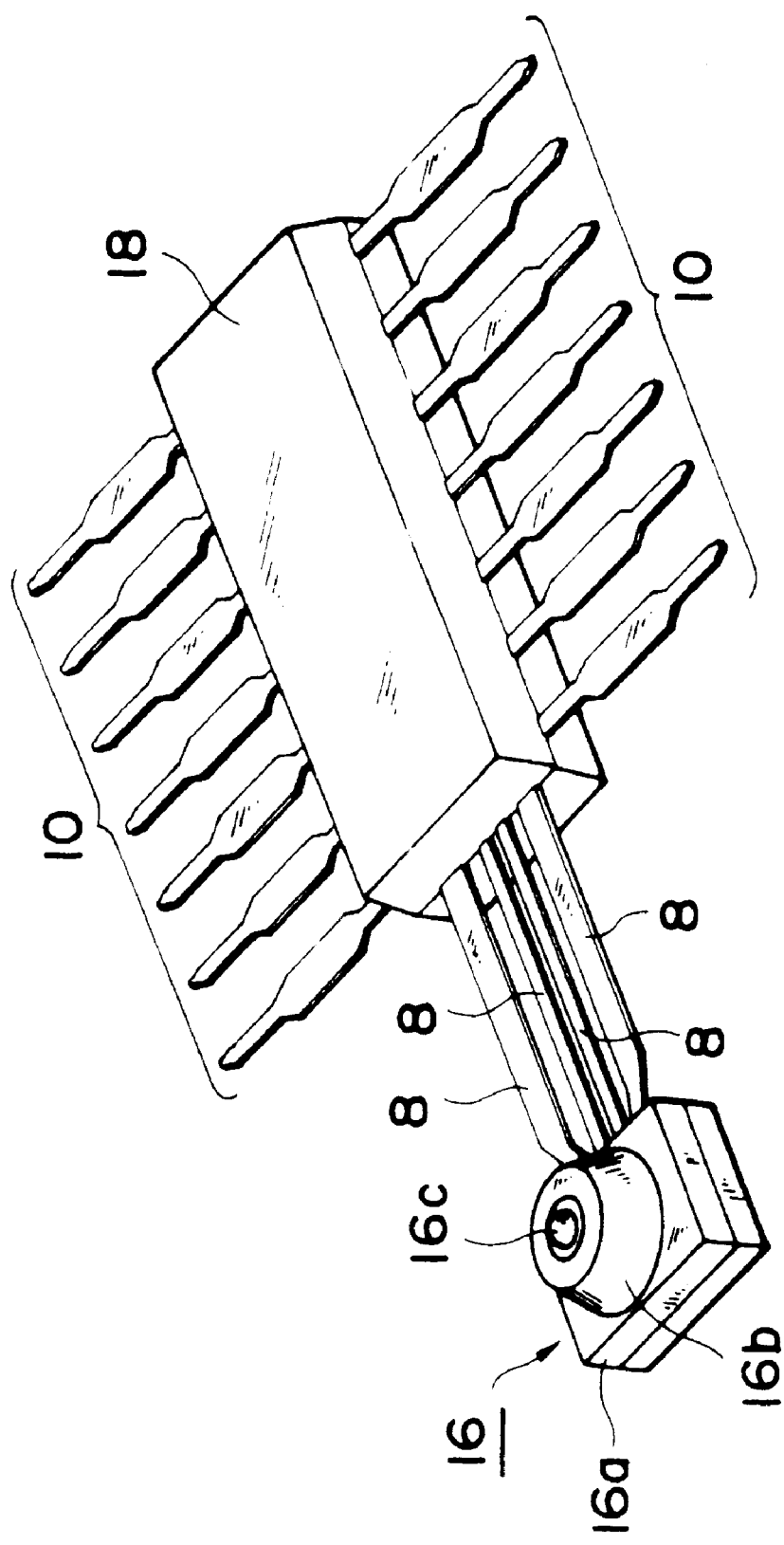
FIG. 2 is a perspective view showing a configuration of an intermediate component for forming the receiving subassembly.
Figure 3:
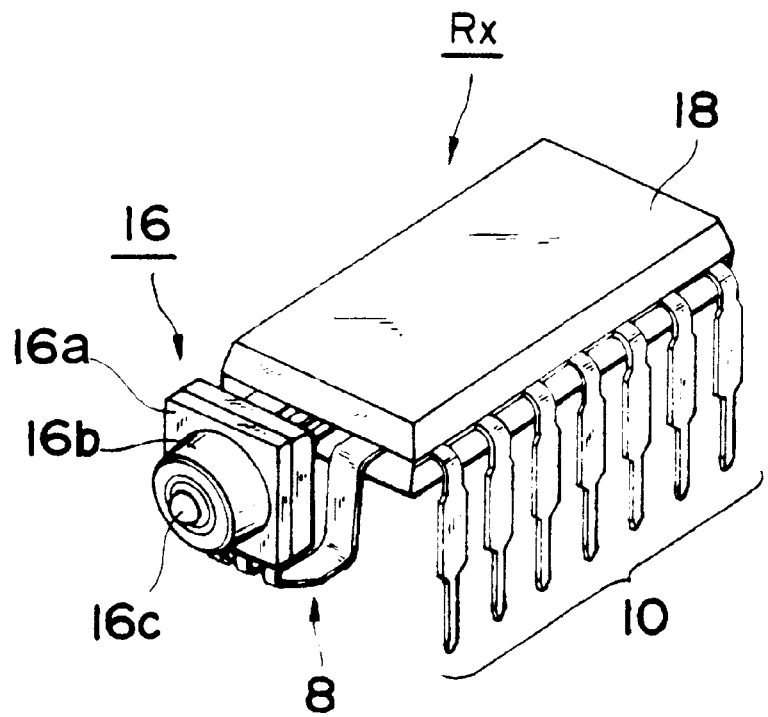
FIG. 3 is a perspective view showing a configuration of the receiving subassembly.

After wiring required parts with bonding wires, the receiving subassembly Rx is accommodated in a resin-molding die having a predetermined form, in which the optical device mounting section 4 and the electronic device mounting section 6 are separately transfer-molded with a resin transparent to the optical signal, and then unnecessary parts of the lead frame 2 are cut off, thus leaving an intermediate component, such as that shown in FIG. 2, comprising a first encapsulating portion 16 integrally encapsulating the optical device mounting section 4, the sub-mount member 12, and the optical device 14 together, and a second encapsulating portion 18 integrally encapsulating the electronic device mounting section 6 and the electronic device together.

Thus transfer-molded first encapsulating portion 16 has a configuration in which a rectangular base 16a, a pedestal 16b shaped like a circular truncated cone, and an aspherical lens 16c molded at the apex part of the pedestal 16b are integrated together. The optical axis of the aspherical lens 16c and that of the light-receiving surface of the optical device 14 coincide with each other. The pedestal 16b is shaped like a circular truncated cone, concentric with the aspherical lens 16c and the light-receiving surface of the optical device 14, having a side wall with a predetermined angle of inclination and a predetermined height such as to taper down toward the apex part thereof.

Then, each of the inner lead pins 8 is bent into a hook shape, so that the light-collecting aspherical lens 16c faces opposite to the second encapsulating portion 18. Further, the outer lead pins 10 are bent, so as to form the receiving subassembly Rx of DIP (dual inline package) type such as that shown in FIG. 3.

Subsequently, a cylindrical sleeve SL for accommodating a ferrule of an optical fiber connector is secured to the pedestal 16b of the first encapsulating portion 16, whereby the receiving subassembly Rx integrated with the sleeve SL is accomplished.

Here, the cylindrical sleeve SL and the pedestal 16b are secured to each other by the securing step explained hereinafter.

Figure 4:
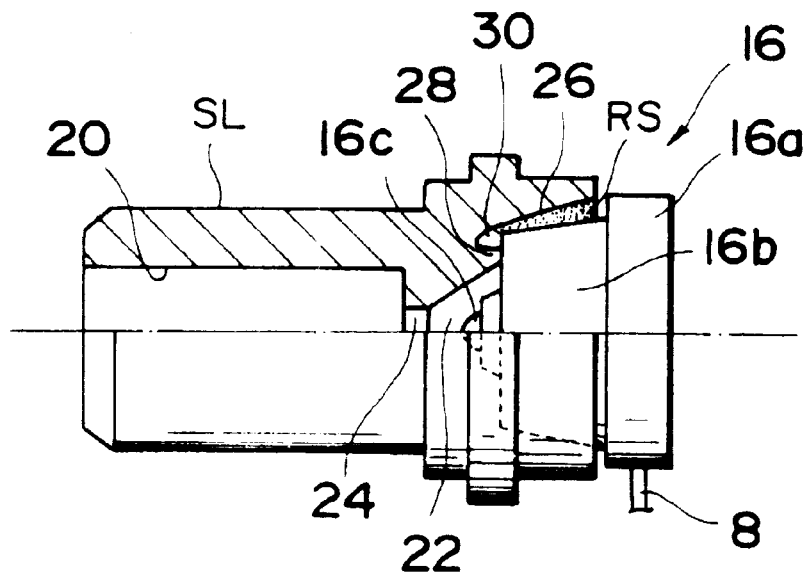
FIG. 4 is an explanatory view for explaining a configuration in which a sleeve is secured to the receiving subassembly, and this securing step.

In FIG. 4, the cylindrical sleeve SL is molded with an opaque resin and has an insertion hole 20 for receiving the ferrule from the front end side, a mating hole 22 for mating with the pedestal 16b from the rear end side, and a communication hole 24 for communicating the insertion hole 20 and the mating hole 22 to each other. The mating hole 22 has an inner peripheral wall 26 shaped like a circular truncated cone in conformity to the side wall form of the pedestal 16b, whereas the deeper side of the inner peripheral wall 26 is formed with an annular projection 28 and an annular depression 30.

The pedestal 16b, with its side wall coated with a UV-curable resin RS, is inserted into the mating hole 22. After centering, the UV-curable resin RS is irradiated with ultraviolet rays so as to be cured, whereby the pedestal 16b is temporarily secured. Further, the contacting part between the pedestal 16b and the mating hole 22 is filled with a thermosetting epoxy one-component adhesive, so that the first encapsulating portion 16 and the cylindrical sleeve SL are secured to each other more firmly.

Figure 5:
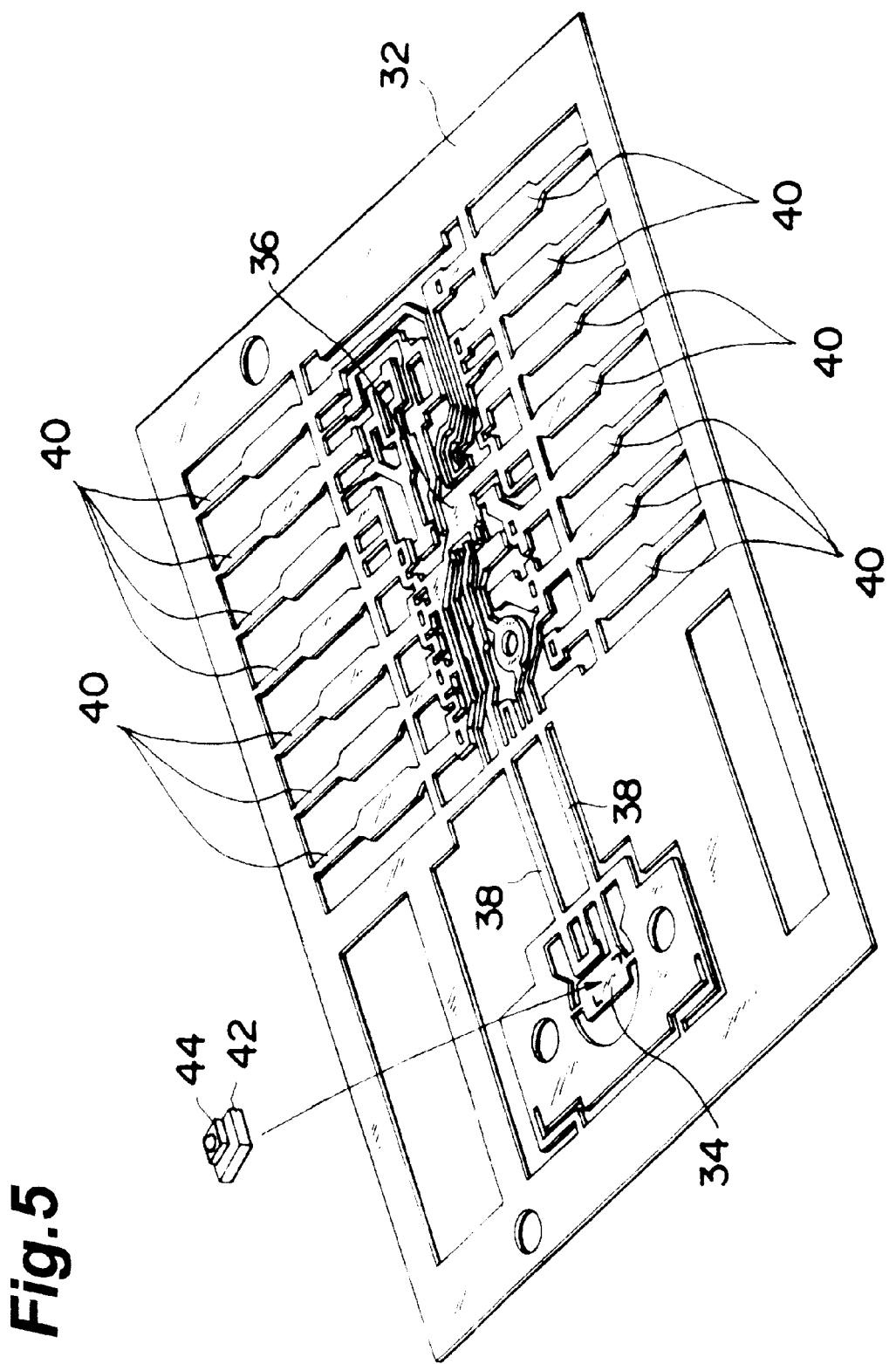
FIG. 5 is a perspective view showing a configuration of a lead frame for forming a transmitting subassembly.
Figure 6:
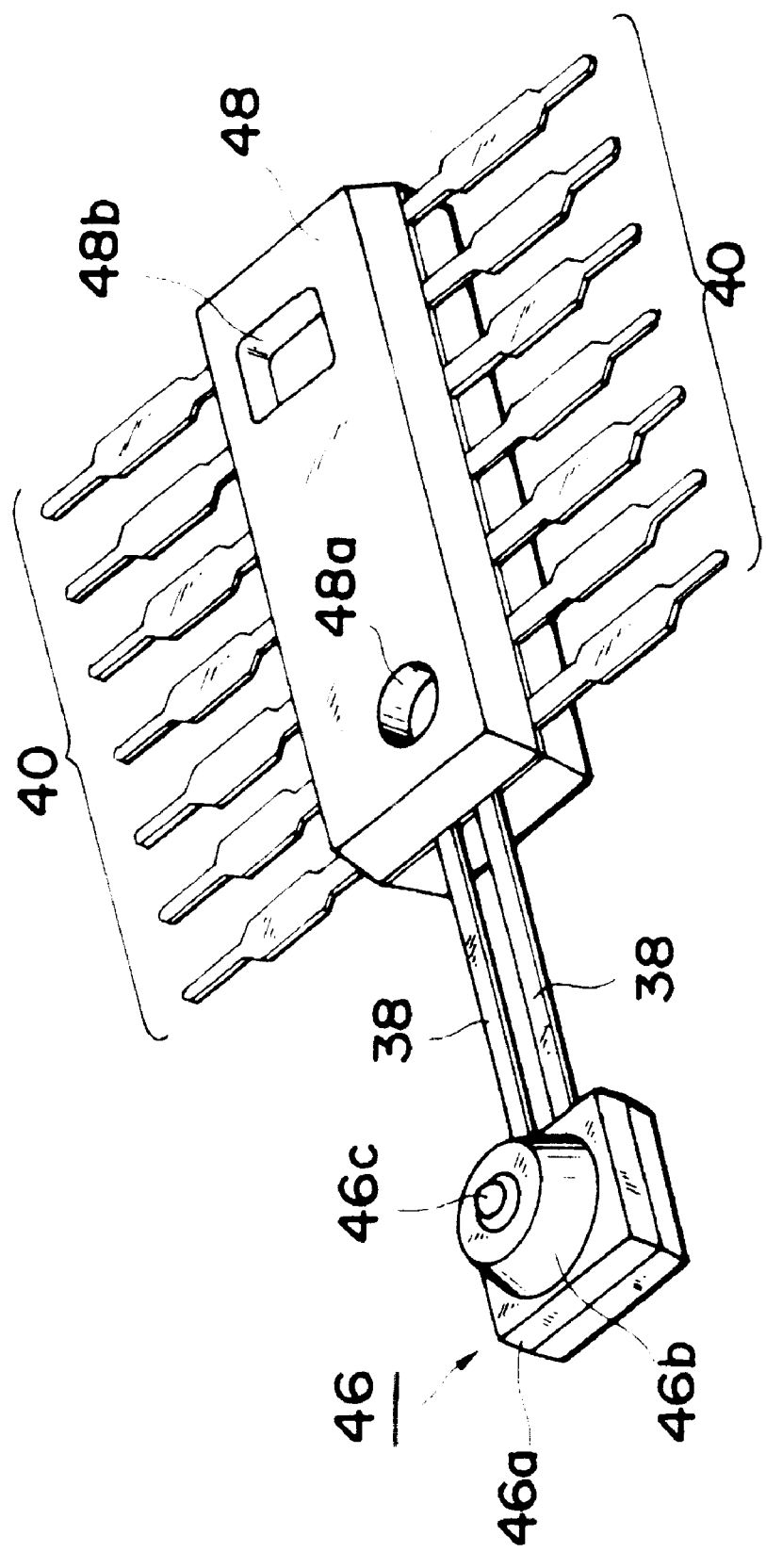
FIG. 6 is a perspective view showing a configuration of an intermediate component for forming the transmitting subassembly.
Figure 7:
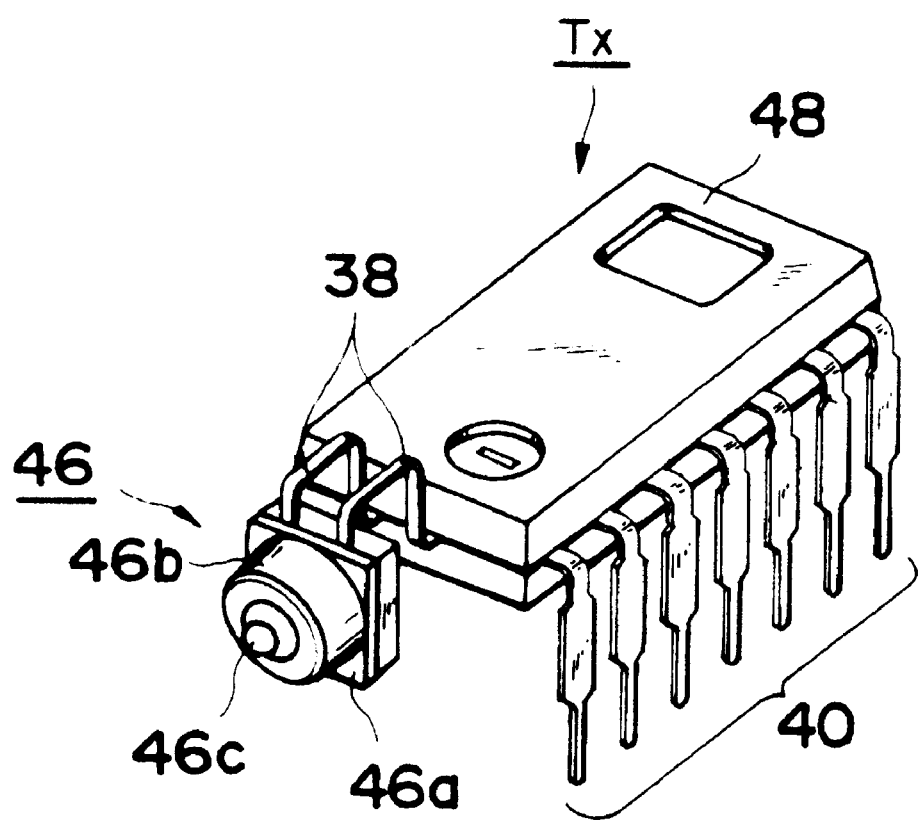
FIG. 7 is a perspective view showing a configuration of the transmitting subassembly.

With reference to FIGS. 5 to 7, the configuration of a transmitting subassembly Tx, which is an optical module having a light-emitting device, will now be explained together with its manufacturing process.

For the transmitting subassembly Tx, a metal lead frame 32 having a configuration shown in FIG. 5 is used. The lead frame 32 is formed with an optical device mounting section 34 for mounting an optical device, an electronic device mounting section 36 for mounting an electronic device, 2 inner lead pins 38 for electrically and mechanically connecting these mounting sections 34, 36 to each other, and 14 outer lead pins 40 positioned on both sides of the electronic device mounting section 36.

Via a sub-mount member 42, an optical device 44 in the form of a semiconductor chip (bare chip) is secured onto the optical device mounting section 34, whereas an electronic device for supplying an electric signal to the optical device 44 is installed on the electronic device mounting section 36.

Here, the sub-mount member 42 is a member for dissipating heat and is formed from diamond or an aluminum nitride material. On the other hand, a light-emitting device such as a surface-emitting InGaAsP light-emitting diode adapted to emit an optical signal in the 1.3-$\mu$m band or a surface-emitting InGaAs laser diode is employed as the optical device 44.

After wiring required parts with bonding wires, the transmitting subassembly Tx is accommodated in a resin-molding die having a predetermined form, in which the optical device mounting section 34 and the electronic device mounting section 36 are separately transfer-molded with a resin transparent to the optical signal, and then unnecessary parts of the lead frame 32 are cut off, thus leaving an intermediate component, such as that shown in FIG. 6, comprising a first encapsulating portion 46 integrally encapsulating the optical device mounting section 34, the sub-mount member 42, and the optical device 44 together, and a second encapsulating portion 48 integrally encapsulating the electronic device mounting section 36 and the electronic device together.

Thus transfer-molded first encapsulating portion 46 has a configuration in which a rectangular base 46a, a pedestal 46b shaped like a circular truncated cone, and an aspherical lens 46c molded at the apex part of the pedestal 46b are integrated together. The optical axis of the aspherical lens 46c and that of the light-receiving surface of the optical device 44 coincide with each other. The pedestal 46b is shaped like a circular truncated cone, concentric with the aspherical lens 46c and the light-receiving surface of the optical device 44, having a side wall with a predetermined angle of inclination and a predetermined height such as to taper down toward the apex part thereof.

The second encapsulating portion 48 is provided with recesses 48a, 48b for exposing predetermined areas of the electronic device mounting section 36 therethrough. The recess 48a accommodates therein a small-size variable resistor or the like connected to the installed electronic device and used for finely adjusting the current level of the electric signal supplied to the optical device 44. The recess 48b is provided for measuring the potential at a predetermined pattern of the lead frame with a probe pin at the time of this fine adjustment.

Then, each of the inner lead pins 38 is bent into a hook shape, so that the light-collecting aspherical lens 46c faces opposite to the second encapsulating portion 48. Further, the outer lead pins 40 are bent, such as to form the transmitting subassembly Tx of DIP (dual inline package) type such as that shown in FIG. 7.

Subsequently, by a securing step similar to that shown in FIG. 4, a cylindrical sleeve SL' for accommodating a ferrule of an optical fiber connector is secured to the pedestal 46b of the first encapsulating portion 46, whereby the transmitting subassembly Tx integrated with the sleeve SL' is accomplished.

Figure 8:
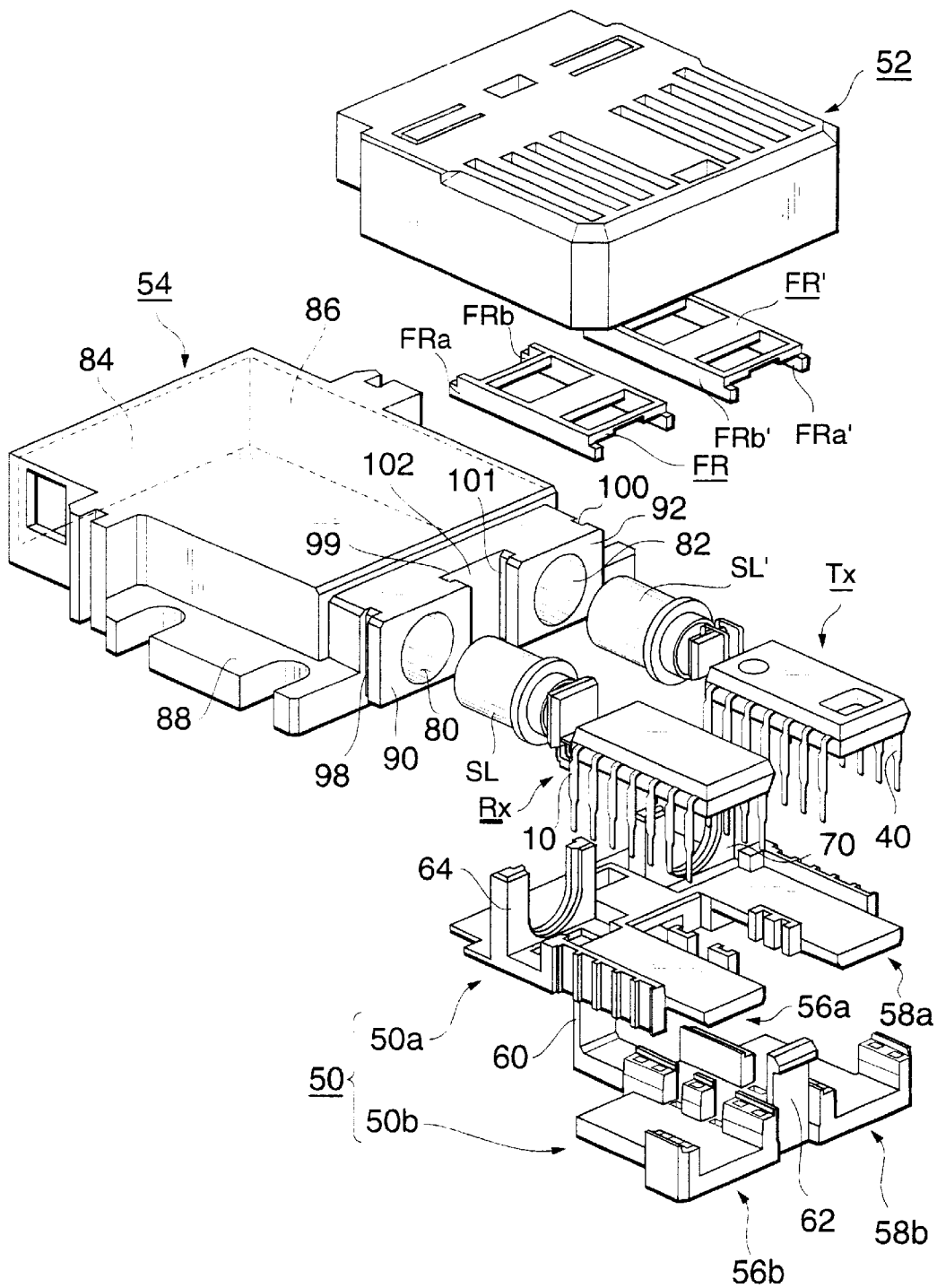
FIG. 8 is a perspective view showing a first embodiment of the optical data link in accordance with the present invention in an exploded state.

A first embodiment of the optical data link in accordance with the present invention using the above-mentioned receiving subassembly Rx and transmitting subassembly Tx will now be explained. FIG. 8 is a perspective view showing the optical data link of this embodiment in an exploded state.

The housing of the optical data link in this embodiment comprises a main body lower part 50, constituted by a conductive section 50a and an insulating section 50b, for mounting the receiving subassembly Rx and the transmitting subassembly Tx; a main body upper part 52 acting as a lid for the main body lower part 50; frames FR, FR' for covering the receiving subassembly Rx and the transmitting subassembly Tx, respectively; and an optical receptacle section 54 for detachably mating with an optical connector. As these members are assembled together, an optical data link having an integrated structure is formed.

Figure 9:
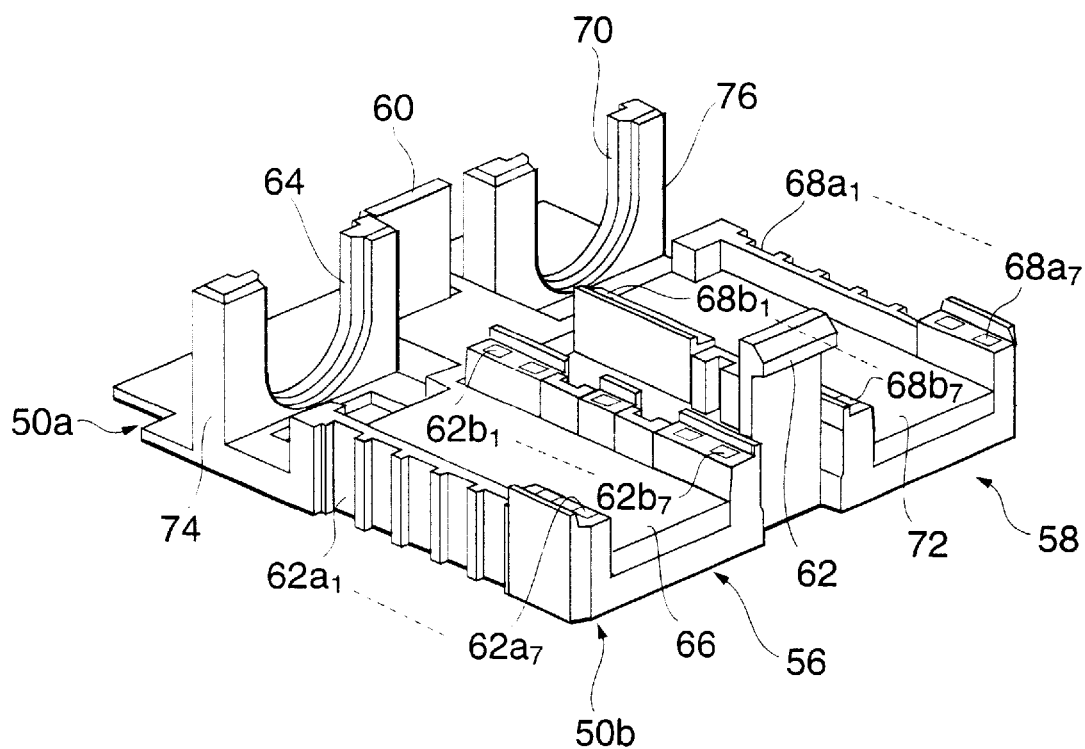
FIG. 9 is a perspective view of a main body lower part comprising a conductive section and an insulating section.

FIG. 9 is a perspective view showing the main body lower part in the state where the conductive section 50a and the insulating section 50b are assembled together. The conductive section 50a constituting the main body lower part 50 is integrally molded with a liquid crystal polymer resin, and all the exterior surfaces thereof are provided with conductive plating of copper (Cu), nickel (Ni), or the like. The insulating section 50b, on the other hand, is molded with a polyphenylene sulfide resin.

The conductive section 50a and the insulating section 50b are formed with a first conductive mount 56a and a first insulating mount 56b, respectively. These mounts, when overlaid on each other, form a first mount 56 for mounting the receiving subassembly Rx in the main body lower part 50. Similarly, the conductive section 50a and the insulating section 50b are formed with a second conductive mount 58a and a second insulating mount 58b, respectively. These mounts, when overlaid on each other, form a second mount 58 for mounting the transmitting subassembly Tx in the main body lower part 50.

The insulating section 50b is formed with a pair of pawls 60, 62 vertically projecting from between the first and second mounts 56, 58. The first conductive mount 56a of the conductive section 50a is formed with a U-shaped guide projection 64 for mating with the cylindrical sleeve SL, and a rectangular mounting table 66 for keeping the second encapsulating section 18 at a predetermined height. On the other hand, the second conductive mount 58a is formed with a U-shaped guide projection 70 for mating with the cylindrical sleeve SL', and a rectangular mounting table 72 for keeping the second encapsulating section 48 at a predetermined height.

The first mount 56 has a plurality of elongated guide grooves 62a, 62b for individually engaging the outer lead pins 10 of the receiving subassembly Rx one by one. In this embodiment, the guide grooves 62a, 62b are provided 7 by 7. When they are successively referred to as $62a_1$ to $62a_7$ and $62b_1$ to $62b_7$ from the side nearer the guide projection 64, the guide grooves $62a_1$ to $62a_5$, $62b_3$, and $62b_5$ are conductive guide grooves formed in the conductive section 50a. By contrast, the guide grooves $62a_6$, $62a_7$, $62b_1$, $62b_2$, $62b_4$, $62b_6$, and $62b_7$ are insulating guide grooves formed in the insulating section 50b.

Of the outer lead pins 10 in the receiving subassembly Rx secured to the first mount 56, those engaging the conductive guide grooves $62a_1$ to $62a_5$, $62b_3$, and $62b_5$ formed in the conductive section 50a are set to a ground potential and used for grounding, and these guide grooves are formed such as to be exposed to the outside. Further, the respective portions of the insulating section 50b below the guide grooves $62b_3$ and $62b_5$ are formed with openings for projecting therethrough the outer lead pins 10 from the lower surface of the main body lower part 50.

Each of the insulating guide grooves $62a_6$, $62a_7$, $62b_1$, $62b_2$, $62b_4$, $62b_6$, and $62b_7$ formed in the insulating section 50b is formed as a through hole having a covered exterior such that its corresponding outer lead pin engaged therewith would not come into contact with the conductive parts. In such a configuration, when the receiving subassembly Rx is mounted on the first mount 56, the outer lead pins 10 engage their corresponding guide grooves 62a, 62b, and their respective lower end portions penetrate therethrough to project from the lower surface side of the main body lower part 50.

The second mount 58 has a plurality of elongated guide grooves 68a, 68b for individually engaging the outer lead pins 10 of the transmitting subassembly Tx one by one. In this embodiment, the guide grooves 68a, 68b are provided 7 by 7. When they are successively referred to as $68a_1$ to $68a_7$ and $68b_1$ to $68b_7$ from the side nearer the guide projection 70, the guide grooves $68a_1$ to $68a_5$, $68b_4$, and $68b_5$ are conductive guide grooves formed in the conductive section 50a. By contrast, the guide grooves $68a_6$, $68a_7$, $68b_1$ to $68b_3$, $68b_6$, and $68b_7$ are insulating guide grooves formed in the insulating section 50b.

Of the outer lead pins 40 in the transmitting subassembly Tx secured to the second mount 58, those engaging the conductive guide grooves $68a_1$ to $68a_5$, $68b_4$, and $68b_5$ formed in the conductive section 50a are set to a ground potential and used for grounding, and these guide grooves are formed such as to be exposed to the outside. Further, the respective portions of the insulating section 50b below the guide grooves $68b_4$ and $68b_5$ are formed with openings for projecting the outer lead pins 40 from the lower surface of the main body lower part 50.

Each of the insulating guide grooves $68a_6$, $68a_7$, $68b_1$ to $68b_3$, $68b_6$, and $68b_7$ formed in the insulating section 50b is formed as a through hole having a covered exterior such that its corresponding outer lead pin engaged therewith would not come into contact with the conductive parts. In such a configuration, when the transmitting subassembly Tx is mounted on the second mount 58, the outer lead pins 40 engage their corresponding guide grooves 68a, 68b, and their respective lower end portions penetrate therethrough to project from the lower surface side of the main body lower part 50.

Figure 10:
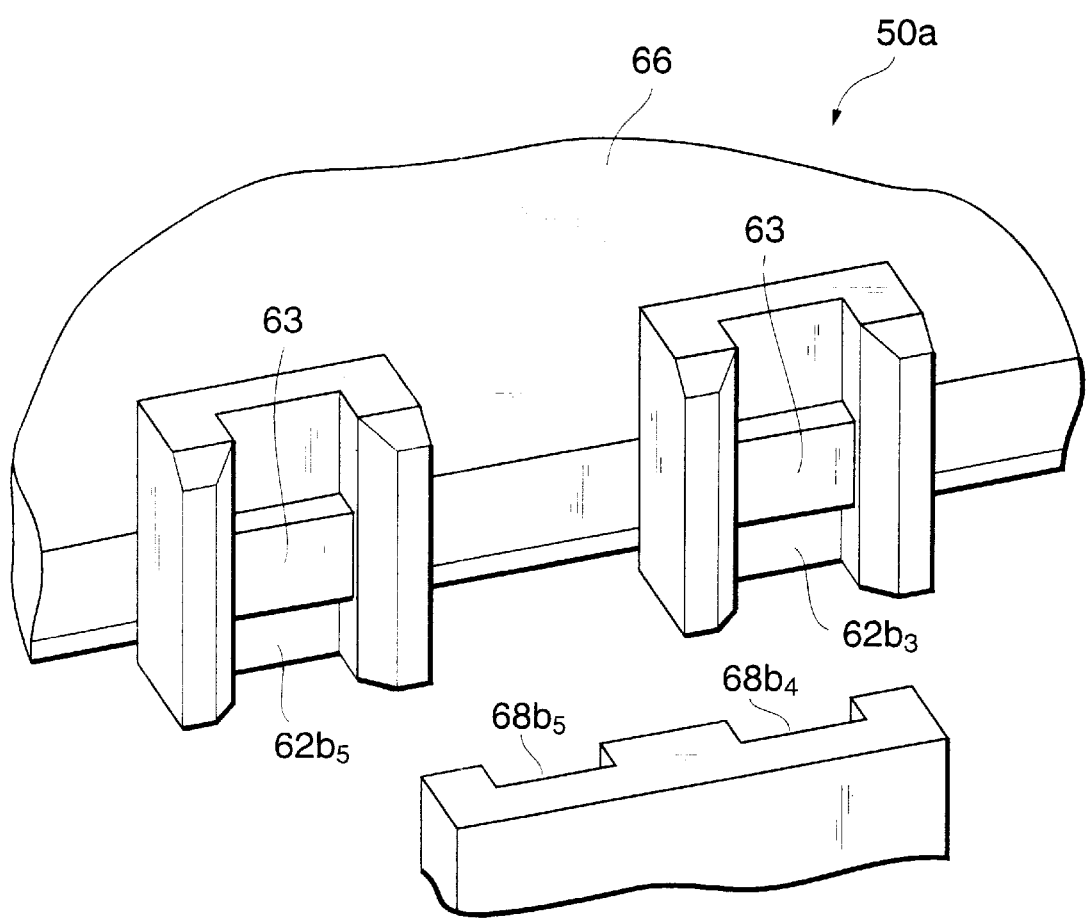
FIG. 10 is a partially enlarged perspective view showing a configuration of the conductive section in the main body lower part.

In this embodiment, of the guide grooves 62a, 62b, 68a, 68b, each of two guide grooves $62b_3$, $62b_5$ formed inside the conductive section 50a of the first conductive mount 56a is partly formed with a protrusion 63 as shown in a partly enlarged view of FIG. 10.

Figure 11:
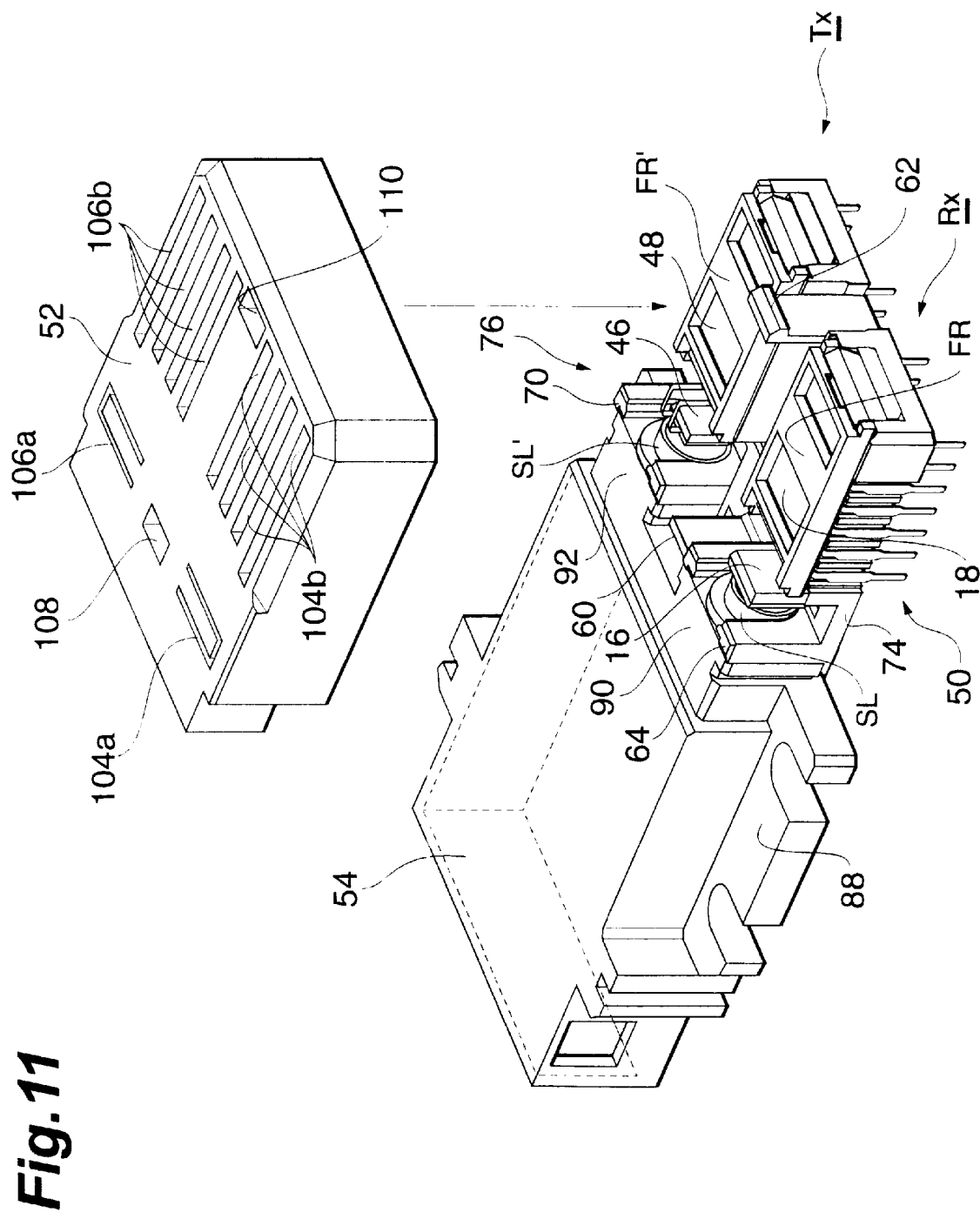
FIG. 11 is a perspective view showing a state where the main body lower part and an optical receptacle section are connected together.

In thus configured main body lower part 50, as shown in FIG. 11, the receiving subassembly Rx and the transmitting subassembly Tx are mounted on the first mount 56 and the second mount 58, respectively, so as to form an integrated intermediate component.

The optical receptacle section 54 is injection-molded with a hard PPS (polyphenylene sulfide) resin. As shown in FIG. 8, the rear side of the optical receptacle section 54 is formed with longitudinally-extending cylindrical mating holes 80, 82 for mating with the cylindrical sleeves SL, SL', respectively; whereas the front side is formed with an opening 84 for inserting an optical connector receiving a ferrule of an optical fiber connector, and a rectangular mating hole 86 for communicating the opening 84 and the mating holes 80, 82 to each other.

Each side of the optical receptacle section 54 is provided with a screw attachment 88 for determining the position where the optical receptacle section 54 is attached to a printed circuit board, for example, and securing them together with the aid of fastening screws, the screw attachment 88 being formed thicker than the rest in order to attain mechanical strength in particular.

Further, rectangular rear end portions 90, 92 formed with the mating holes 80, 82 are provided with vertical grooves 98, 99, 100, 101 for mating with protrusions 133, 134, 135, 136 (FIG. 12) of the main body upper part 52; whereas a rectangular depression 102 for mating with the pawl 60 is formed between the rear end portions 90, 92.

As shown in FIG. 11, the sleeves SL, SL' secured to the receiving subassembly Rx and the transmitting subassembly Tx are fitted into the mating holes 80, 82, respectively, and are integrated together by mating the depressions 130a, 130b, 132a, 132b (FIG. 12) of the main body upper part 52 with the rear end portions 90, 92 and guide projections 64, 70.

The main body upper part 52 is integrally molded with a liquid crystal polymer resin; whereas its upper portion is formed with a plurality of elongated holes 104a, 104b corresponding to the first and second encapsulating portions 16, 18 of the receiving subassembly Rx, a plurality of elongated holes 106a, 106b corresponding to the first and second encapsulating portions 46, 48 of the transmitting subassembly Tx, and a pair of engagement holes 108, 110 for engaging the pawls 60, 62, respectively.

Figure 12:
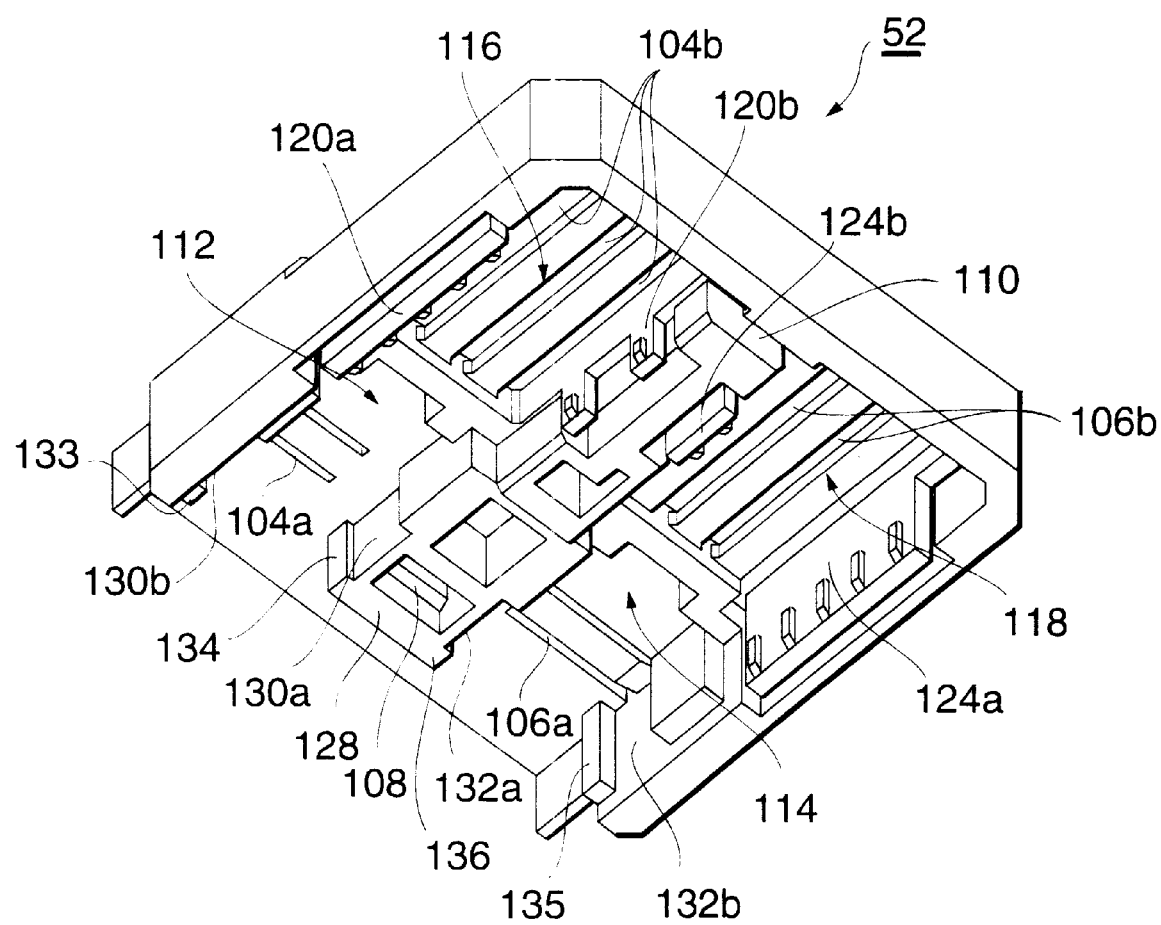
FIG. 12 is a perspective view showing an inner configuration of a main body upper part.

Also, as shown in FIG. 12, the inside of the main body upper part 52 is formed with cavities 112, 114 for accommodating the respective first encapsulating portions 16, 46 of the subassemblies Rx, Tx, and cavities 116, 118 for accommodating the respective second encapsulating portions 18, 48.

Further formed are abutments 120a, 120b for securing the outer lead pins 10 disposed on both sides of the receiving subassembly Rx by pressing them sidewise toward the guide grooves 62a, 62b of the main body lower part 50, respectively; and abutments 124a, 124b for securing the outer lead pins 40 disposed on both sides of the transmitting subassembly Tx by pressing them sidewise toward the guide grooves 68a, 68b, respectively.

These abutments 120a, 120b, 124a, 124b are disposed at their respective positions corresponding to, of the guide grooves 62a, 62b, 68a, 68b, the conductive guide grooves $62a_1$ to $62a_5$, $62b_3$ and $62b_5$, $68a_1$ to $68a_5$, and $68b_4$ and $68b_5$, which are formed in the conductive section 50a such as to be exposed to the outside, with protrusions for pressing the outer lead pins 10, 40; whereas no abutments are provided for the insulating guide grooves formed like through holes in the insulating section 50b.

Formed in front of the cavities 112, 114 is a protrusion 128 formed with an engagement hole 108. Both sides of the protrusion 128 and the end faces opposing them are formed with depressions 130a, 130b and 132a, 132b for mating with the guide projections 64, 70.

As shown in FIG. 11, the frames FR, FR' are disposed between the top parts of the cavities 116, 118 and the second encapsulating portions 18, 48 of the respective subassemblies Rx, Tx. As shown in FIG. 8, the frames FR, FR' are formed with side portions FRa and FRb, FRa' and FRb' projecting downward on the outer side and inner side of the apparatus, respectively. The inner widths between the side portions FRa and FRb and between the side portions FRa' and FRb' correspond to the widths of the respective second encapsulating portions 18, 48 of the subassemblies Rx, Tx; whereas the downward projecting heights of the side portions FRa and FRb, FRa' and FRb' correspond to the respective distances from the upper surfaces of the second encapsulating portions 18, 48 to the upper ends of the outer lead pins 10, 40.

The frames FR, FR' are arranged on the second encapsulating portions 18, 48 such that the lower surfaces of their upper parts are in contact with the upper surfaces of the second encapsulating portions 18, 48, the side portions FRa and FRb, FRa' and FRb' hold the second encapsulating portions 18, 48, respectively, therebetween, and the lower ends of the side portions FRa and FRb, FRa' and FRb' are in contact with the upper ends of the outer lead pins 10, 40. Held between the top portions of the cavities 116, 118 in the main body upper part 52 and the mounting tables 66, 72 of the main body lower part 50 are the respective second encapsulating portions 18, 48 of the subassemblies Rx, Tx and the frames FR, FR' located thereon.

All the surfaces of the main body upper part 52 are coated with conductive plating such as copper (Cu) or nickel (Ni). The conductive plating has been formed by plating processing with such a thickness that it can directly be soldered, while being prevented from easily peeling off from its base, i.e., liquid crystal polymer resin.

Figure 13:
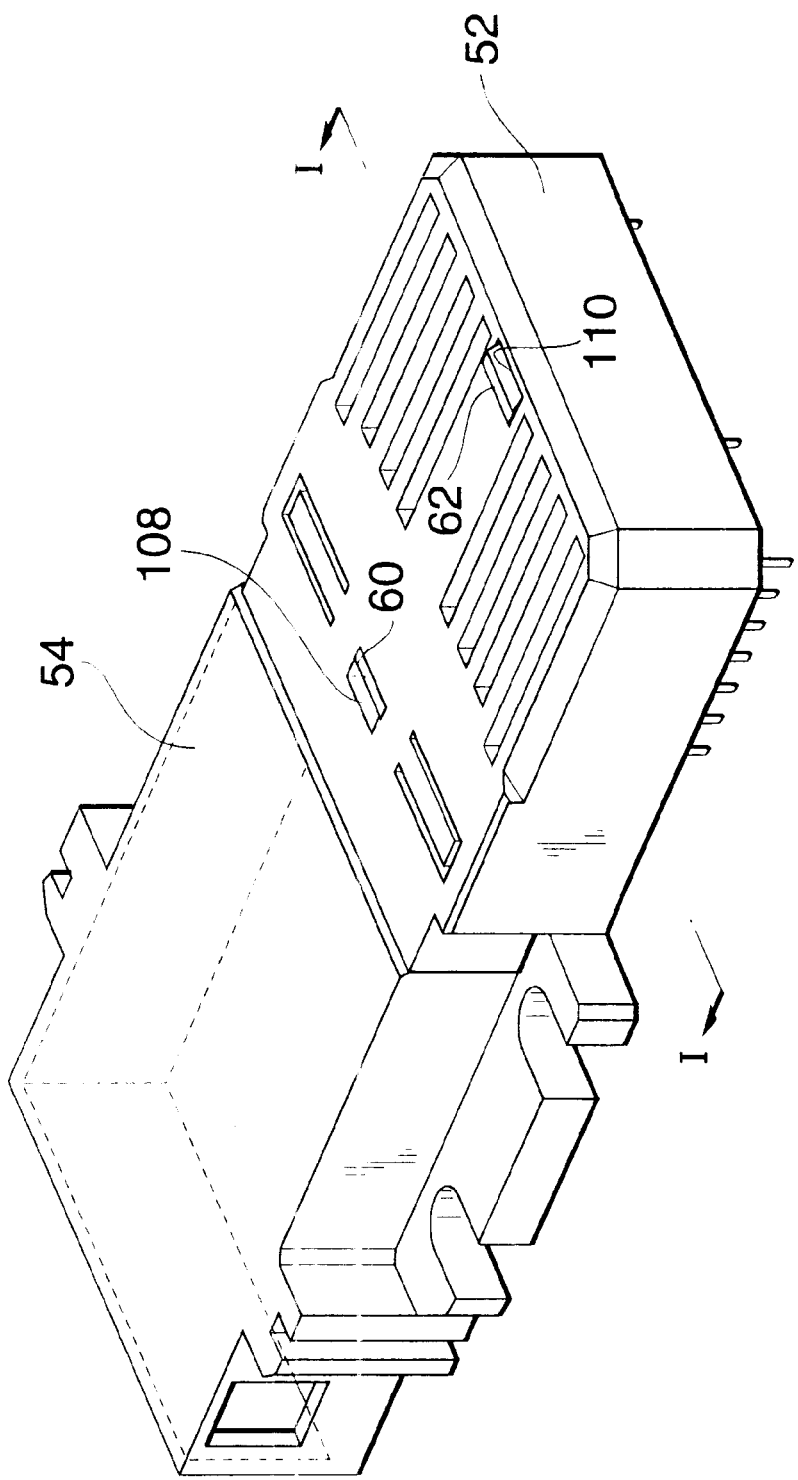
FIG. 13 is a perspective view showing an exterior configuration of the optical data link.

As shown in FIG. 13, the main body lower part 50 is covered with the main body upper part 52, and the pawls 60, 62 are inserted into their corresponding engagement holes 108, 110, whereby the pawls 60, 62 automatically mate with the engagement holes 108, 110 due to their counterforces, thereby accomplishing an optical data link having an integrated structure. When the pawls 60, 62 and the engagement holes 108, 110 are out of their engagement with each other, then the main body upper part 52 can easily be removed from the main body lower part 50.

Figure 14:
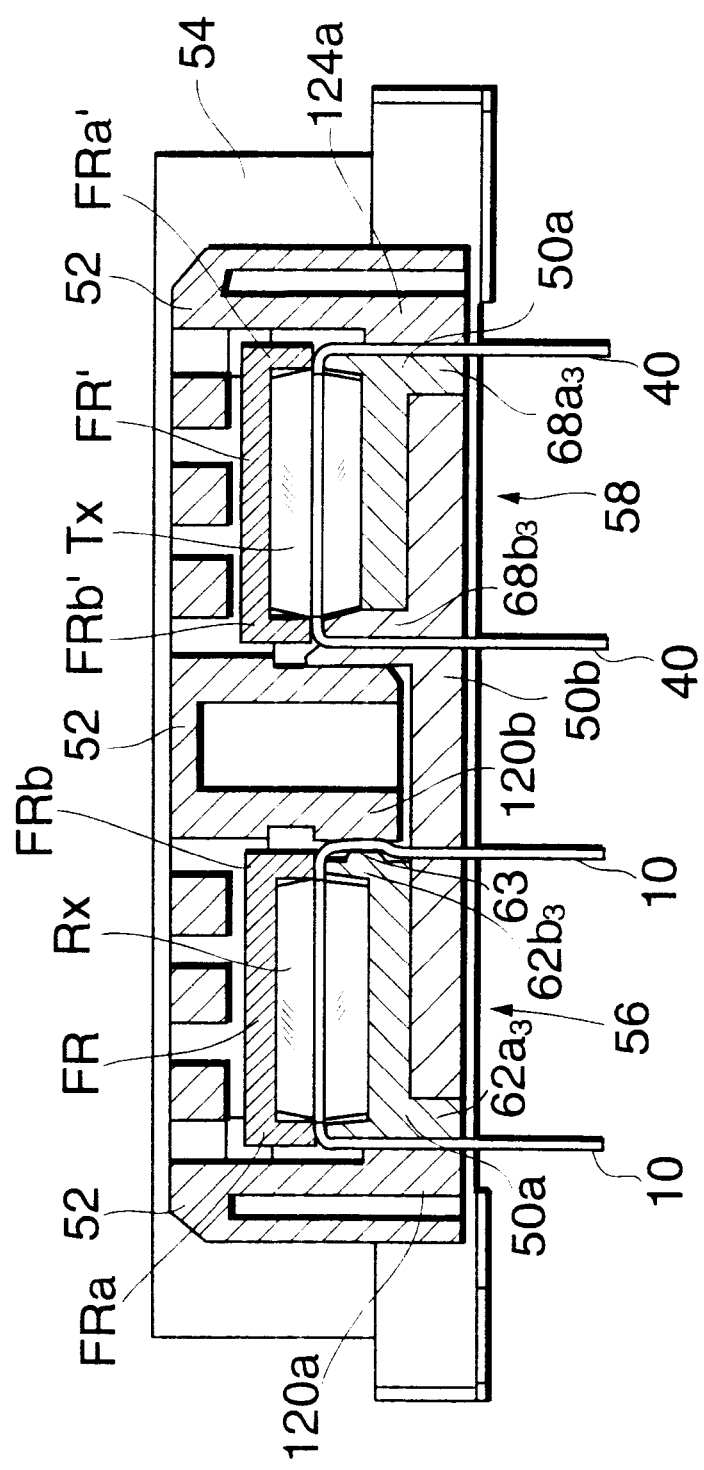
FIG. 14 is a sectional view showing electric contacts among individual sections in the case where a guide groove has a protrusion.

Effects of thus configured optical data link will now be explained. FIG. 14 is a sectional view, taken along the I—I line in FIG. 13, for showing states of connections among individual parts. More specifically, it is a sectional view within a plane including the respective third lead pins 10, 40 of the receiving subassembly Rx and transmitting subassembly Tx from the side nearer the guide projections 64, 70.

In FIG. 11, when the main body upper part 52 is assembled to the main body lower part 50 comprising the conductive section 50a and the insulating section 50b, then the inner wall of the main body upper part 52 comes into contact with the side walls 74, 76 on both sides of the conductive section 50a. Also, the abutments 120a, 120b, 124a, 124b provided in the main body upper part 52 and, of the guide grooves 62a, 62b, 68a, 68b, those formed in the conductive section 50a hold therebetween the grounding outer lead pins so as to come into contact therewith. In this state, when the grounding outer lead pins in the outer lead pins 10, 40 are set to a ground potential, then the whole main body upper part 52 attains the ground potential, whereby the receiving subassembly Rx and the transmitting subassembly Tx can be shielded from external noise.

In the region of the sectional view shown in FIG. 14, the outer lead pin 40 on the inner side of the apparatus is a lead pin for applying a predetermined voltage or for inputting/outputting a signal (not for grounding) and is secured by the insulating guide groove $68b_3$ provided in the insulating section 50b. By contrast, the outer lead pins 10 on both sides of the apparatus and the outer lead pins 40 on the outer side of the apparatus are used for grounding and are in contact with and secured by the conductive guide groove $62a_3$ and the abutment 120a, the conductive guide groove $62b_3$ and the abutment 120b, and the conductive guide groove $68a_3$ and the abutment 124a, respectively. Due to such connections, the conductive section 50a and the main body upper part 52 attain the ground potential. The outer lead pins having a non-ground potential would not come into contact with conductive parts since each of their corresponding insulating guide grooves, such as the insulating guide groove $68b_3$ in FIG. 14, is formed like a through hole.

When the main body lower part 50 is constituted by two members consisting of the conductive section 50a made of a resin coated with conductive plating and the insulating section 50b made of a resin, and the conductive plating on the conductive section 50a and main body upper part 52 is formed on all their surfaces, then the manufacturing process can be simplified, so as to cut down the cost. Such a conductive part 50a can also be made by injection-molding or die-casting from a metal, for example.

Also, in this embodiment in particular, as shown in FIG. 10, the protrusions 63 are formed at predetermined portions where the conductive guide grooves $62b_3$ and $62b_5$ come into contact with their corresponding outer lead pins 10. As a consequence, the outer lead pins 10 are partly elastically deformed by the protrusions 63 as shown in FIG. 14 when inserted into their corresponding grooves, and the contact between the outer lead pins 10 and the conductive parts on the main body side can securely be maintained due to the resulting elastic force. Since the required molding accuracy is alleviated here, the yield would improve. Also, creeping becomes less influential in this case.

Though only two conductive guide grooves $62b_3$ and $62b_5$ are provided with the protrusions 63, other conductive guide grooves for the grounding outer lead pins may similarly be provided with protrusions as well.

Figure 15:
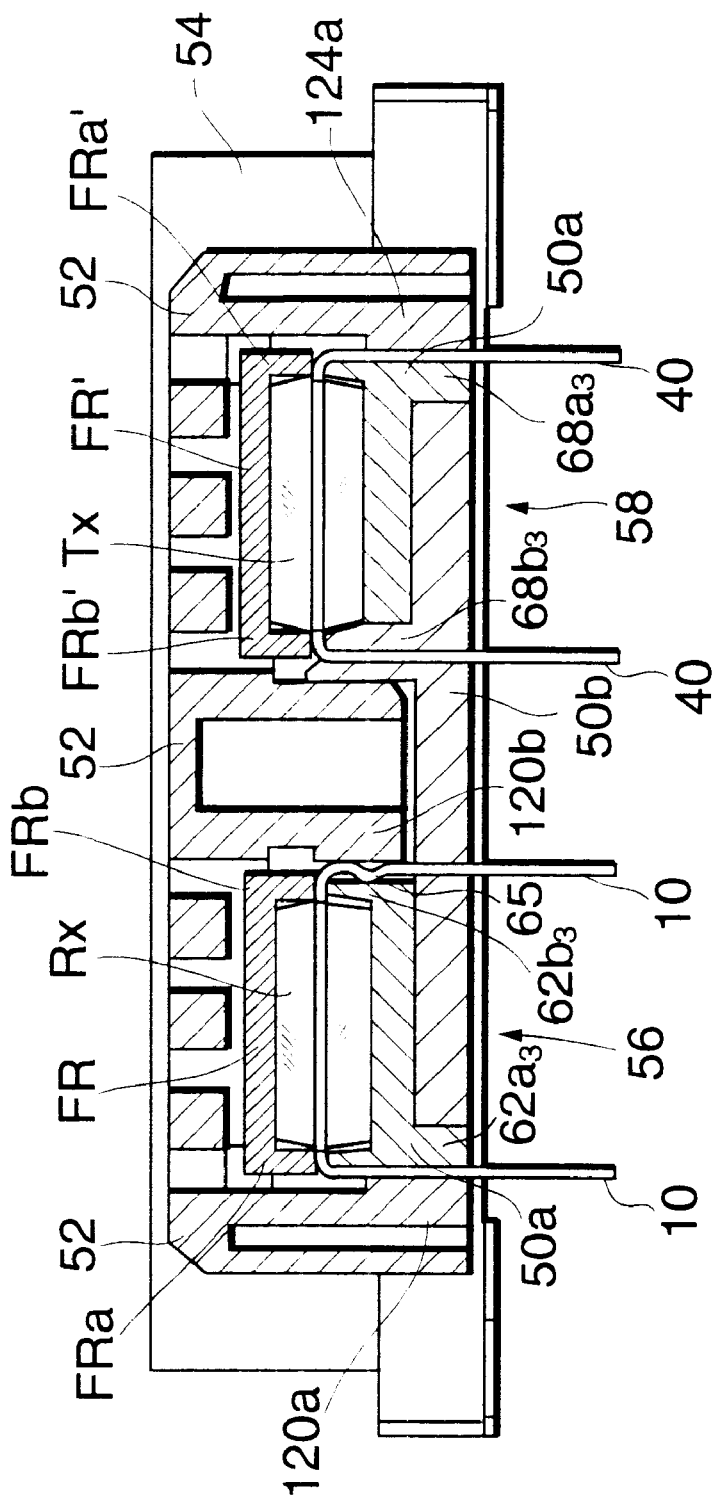
FIG. 15 is a sectional view showing electric contacts among the individual sections in the case where an outer lead pin has a bent portion.

Such secure electric contact can also be realized by various configurations other than the above-mentioned protrusions. For example, as shown in FIG. 15, the conductive guide grooves may be formed without protrusions and the like, and a predetermined outer lead pin 10 may be bent or deformed beforehand by pressing or the like so as to form a bent portion 65, which can similarly maintain contact in a stable fashion.

An environmental resistance test was conducted for the maintenance of electric contact in the optical data link in accordance with this embodiment in which the conductive section 50a and the main body upper part 52 are made of a resin with all-surface plating. The test conditions were such that thermal shock tests were carried out with 1000 cycles each at −40° C. or lower and 85° C. or higher, a high-temperature shelf test was carried out at 110° C. for 1500 hours, and a high-temperature and high-humidity test at 85° C. with 85% RH was carried out for 1500 hours. It has been evidenced that electric contact was sufficiently maintained and highly reliable electromagnetic shield was realized in each case.

Further, in this embodiment, the respective inner lead pins 8, 38 of the subassemblies Rx, Tx are bent into a hook shape in directions different from each other, so as to realize a structure less likely to be influenced by electromagnetically induced noise therebetween. As a consequence, so-called crosstalk and the like can be restrained from occurring between the subassemblies Rx, Tx.

Since the main body upper part 52 is formed with the elongated holes 104a, 104b, 106a, 106b, it can easily be washed with water in the process of being installed onto the wiring board of an optical link. Also, at the time of operation, the heat dissipated from the individual subassemblies Rx, Tx can efficiently be released to the outside through the elongated holes 104a, 104b, 106a, 106b.

Further, since the respective second encapsulating portions 18, 48 of the subassemblies Rx, Tx are held between the top portion of the inner wall of the main body upper part 52 and their corresponding mounting tables 66, 72 of the main body lower part 50 with the aid of the frames FR, FR', they are restrained from positionally shifting in their lengthwise directions. Also, since the lower ends of the side portions FRa and FRb, FRa' and FRb' of the frames FR, FR' are disposed such as to be in contact with the upper ends of the outer lead pins 10, 40 as shown in FIG. 14, in the case, for example, that the parts of the outer lead pins 10, 40 projecting from the lower portion of the optical data link are inserted into another apparatus, the outer lead pins 10, 40 are supported as being pressed from thereabove and can be kept from deforming.

Also, since the pawls 60, 62 of the main body lower part 50 and the engagement holes 108, 110 of the main body upper part 52 engage each other, the main body lower part 50 and the main body upper part 52 are restrained from positionally shifting in vertical directions. Further, since the guide projections 64, 70 of the main body lower part 50 mate with their corresponding depressions 130a, 130b; 132a, 132b of the main body upper part 52, the main body lower part 50 and the main body upper part 52 are restrained from positionally shifting sidewise and back and forth.

Since the respective sleeves SL, SL' of the subassemblies Rx, Tx are configured to mate with the guide projections 64, 70 of the main body lower part 50 so as to restrain their movement along the sleeve axes, with the sleeves SL, SL' being precisely fitted into their corresponding mating holes 80, 82 in the optical receptacle section 54, while the rear end portions 90, 92 of the optical receptacle section 54 mate with the grooves of the depressions 130a, 130b, 132a, 132b of the main body upper part 52 together with the guide projections 64, 70; the main body lower part 50, the optical receptacle section 54, and the main body upper part 52 are firmly integrated together. Further, when an optical connector is attached thereto, ferrules of optical fiber connectors can smoothly be installed into the respective sleeves SL, SL', and the optical fibers accommodated in the ferrules of optical fiber connectors can optically be coupled to the light-receiving device and light-emitting device within the subassemblies Rx, Tx with high accuracy.

Though this embodiment relates to the case where the conductive section 50a of the main body lower part 50 and the main body upper part 52 are molded with a liquid crystal polymer resin, other resins such as polyphenylene sulfide resin and syndiotactic polystyrene (SPS), for example, may also be used. Similarly, other resins may be used for the insulating section 50b of the main body lower part 50 and the like. Also, the conductive section 50a, which is a conductive member, and the main body upper part 52 may be made of a metal, for example.

Figure 16:
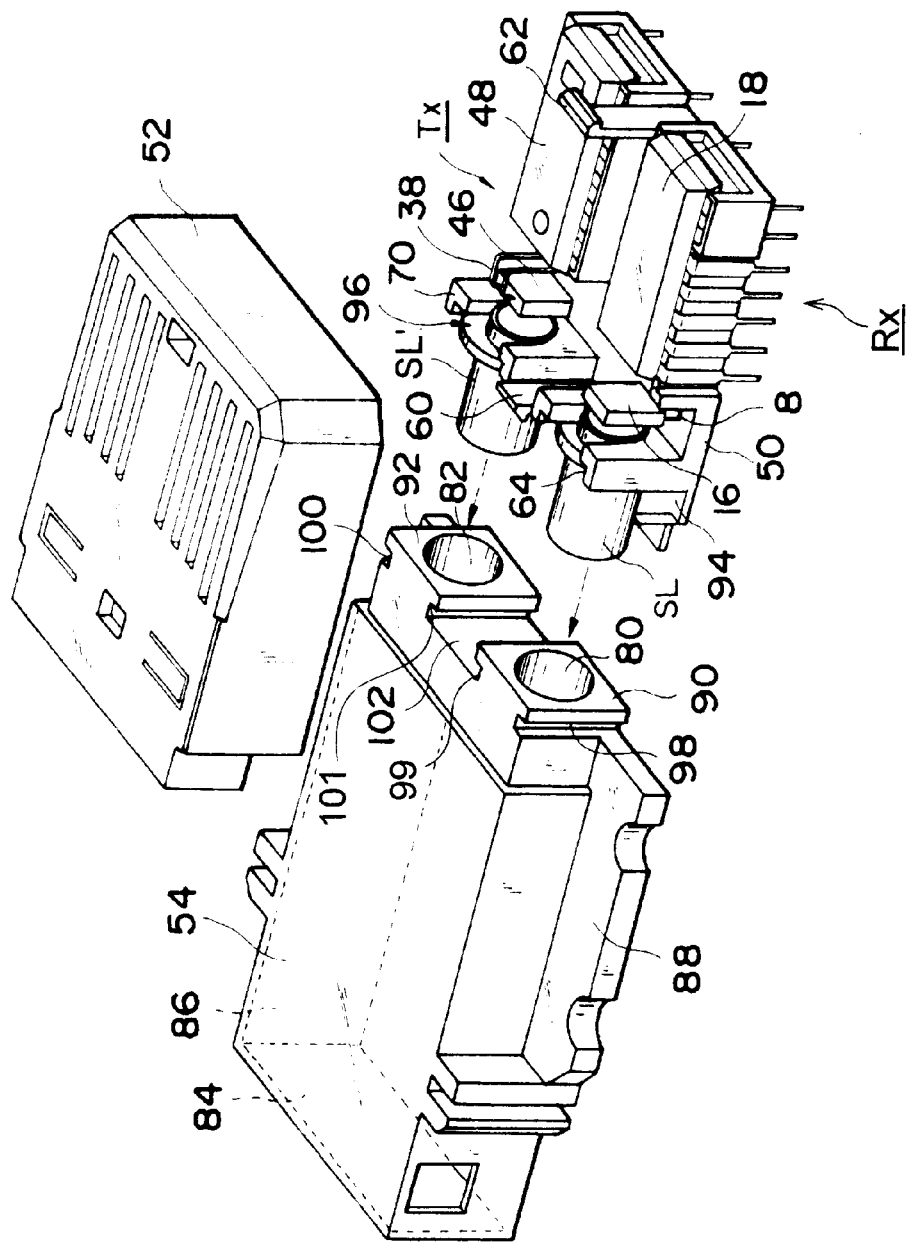
FIG. 16 is a perspective view showing a second embodiment of the optical data link in accordance with the present invention in an exploded state.

A second embodiment of the optical data link in accordance with the present invention will now be explained. FIG. 16 is a perspective view showing the optical data link in accordance with this embodiment in an exploded state.

The housing of the optical data link in accordance with this embodiment comprises a main body lower part 50 for mounting the receiving subassembly Rx and the transmitting subassembly Tx, a main body upper part 52 acting as a lid for the main body lower part 50, and an optical receptacle section 54 for detachably mating with an optical connector. As these members are assembled together, an optical data link having an integrated structure is formed.

Figure 17:
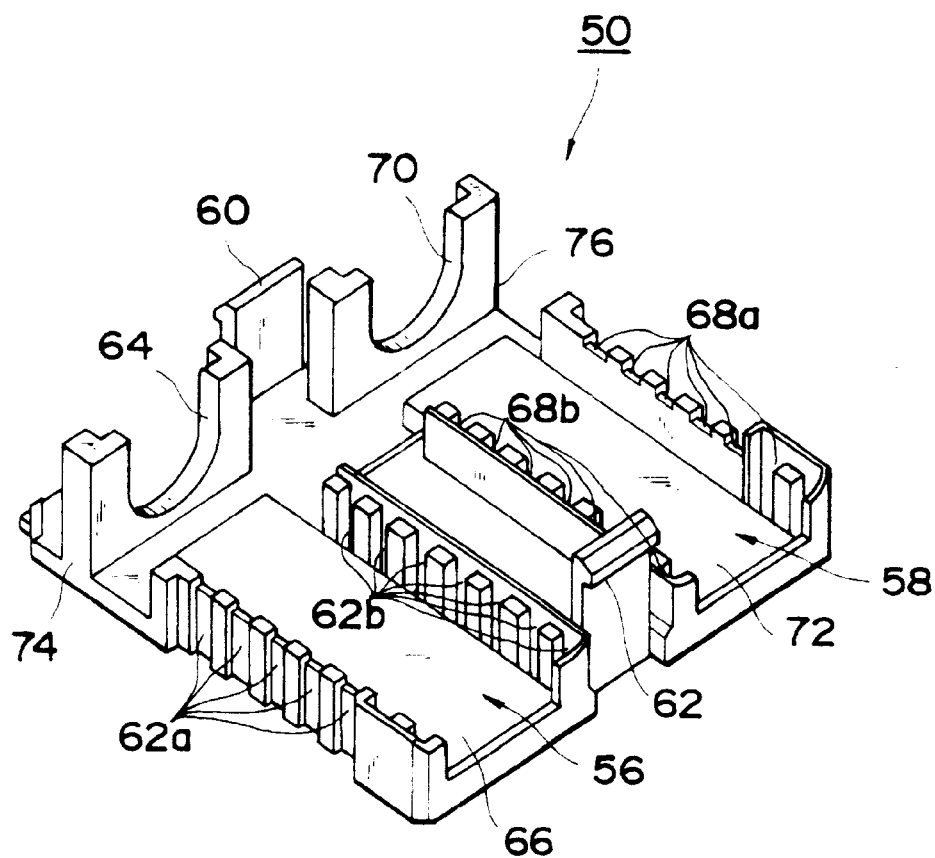
FIG. 17 is a perspective view of a main body lower part.

As shown in FIG. 17, the main body lower part 50 is integrally molded with a liquid crystal polymer resin and has a configuration comprising a first mount 56 for mounting a receiving subassembly Rx, a second mount 58 for mounting a transmitting subassembly Tx, and a pair of pawls 60, 62 vertically projecting from between the first and second mounts 56, 58.

The first mount 56 is formed with a plurality of elongated guide grooves 62a, 62b for individually engaging outer lead pins 10 of the receiving subassembly Rx one by one; a U-shaped guide projection 64 for mating with a cylindrical sleeve SL, and a rectangular mounting table 66 for keeping the second encapsulating portion 18 at a predetermined height.

Here, guide grooves for the outer lead pins 10 set to a ground potential among the plurality of outer lead pins 10, i.e., 5 guide grooves from the side nearer the guide projection 64 in the guide grooves 62a shown in FIG. 17, are exposed to the outside.

Further, the bottom wall of the main body lower part 50 is formed with a plurality of through holes (not illustrated) communicating with guide grooves other than the 5 guide grooves from the side nearer the guide projection 64 in the guide grooves 62a, and the guide grooves 62b. When the receiving subassembly Rx is mounted, the individual outer lead pins 10 engage their corresponding guide grooves 62a, 62b, and the respective end portions of the outer lead pins 10 penetrate through the through holes so as to project from the lower surface side of the main body lower part 50.

The second mount 58 is formed with a plurality of elongated guide grooves 68a, 68b for individually engaging outer lead pins 40 of the transmitting subassembly Tx one by one; a U-shaped guide projection 70 for mating with a cylindrical sleeve SL', and a rectangular mounting table 72 for keeping the second encapsulating portion 48 at a predetermined height.

Here, guide grooves for the outer lead pins 40 set to a ground potential among the plurality of outer lead pins 40, i.e., 5 guide grooves from the side nearer the guide projection 70 in the guide grooves 68a shown in FIG. 17, are exposed to the outside.

Further, the bottom wall of the main body lower part 50 is formed with a plurality of through holes (not illustrated) communicating with guide grooves other than the 5 guide grooves from the side nearer the guide projection 70 in the guide grooves 68a, and the guide grooves 68b. When the transmitting subassembly Tx is mounted, the individual outer lead pins 40 engage their corresponding guide grooves 68a, 68b, and the respective end portions of the outer lead pins 40 penetrate through the through holes so as to project from the lower surface side of the main body lower part 50.

Moreover, in the main body lower part 50, the portion mating with the inner wall of the main body upper part 52, which will be mentioned later, the guide grooves 62a, 68a adapted to engage the outer lead pins set to the ground potential, and the mounting tables 66, 72 are provided with conductive plating such as copper (Cu) or nickel (Ni). For example, the side wall 74 between the guide projection 64 and the guide grooves 62a and the side wall 76 between the guide projection 70 and the guide grooves 68a are provided with the conductive plating.

As shown in FIG. 16, the receiving subassembly Rx is mounted on the first mount 56 of the main body lower part 50, and the transmitting subassembly Tx is mounted on the second mount 58, whereby an integrated intermediate component is formed.

The optical receptacle section 54 is injection-molded with a hard PPS (polyphenylene sulfide) resin. Its configuration is similar to that of the optical receptacle section 54 in the first embodiment shown in FIG. 8.

Figure 18:
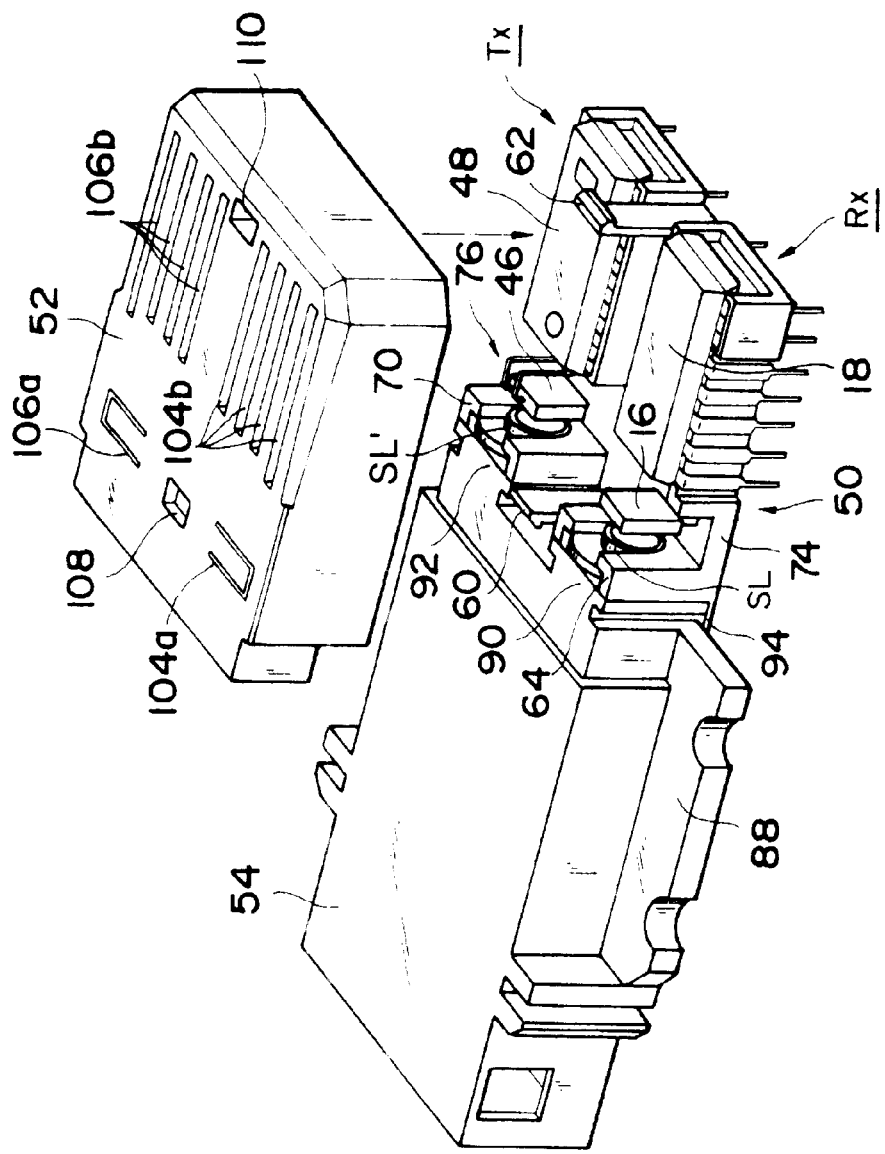
FIG. 18 is a perspective view showing the state where the main body lower part and an optical receptacle section are connected together.

As shown in FIG. 18, the sleeves SL, SL' provided in the receiving subassembly Rx and transmitting subassembly Tx are fitted into mating holes 80, 82, respectively, and depressions 130a, 130b, 132a, 132b of the main body upper part 52 (FIG. 19) are mated with rear end portions 90, 92 and the guide projections 64, 70, whereby these parts are integrated together.

Figure 19:
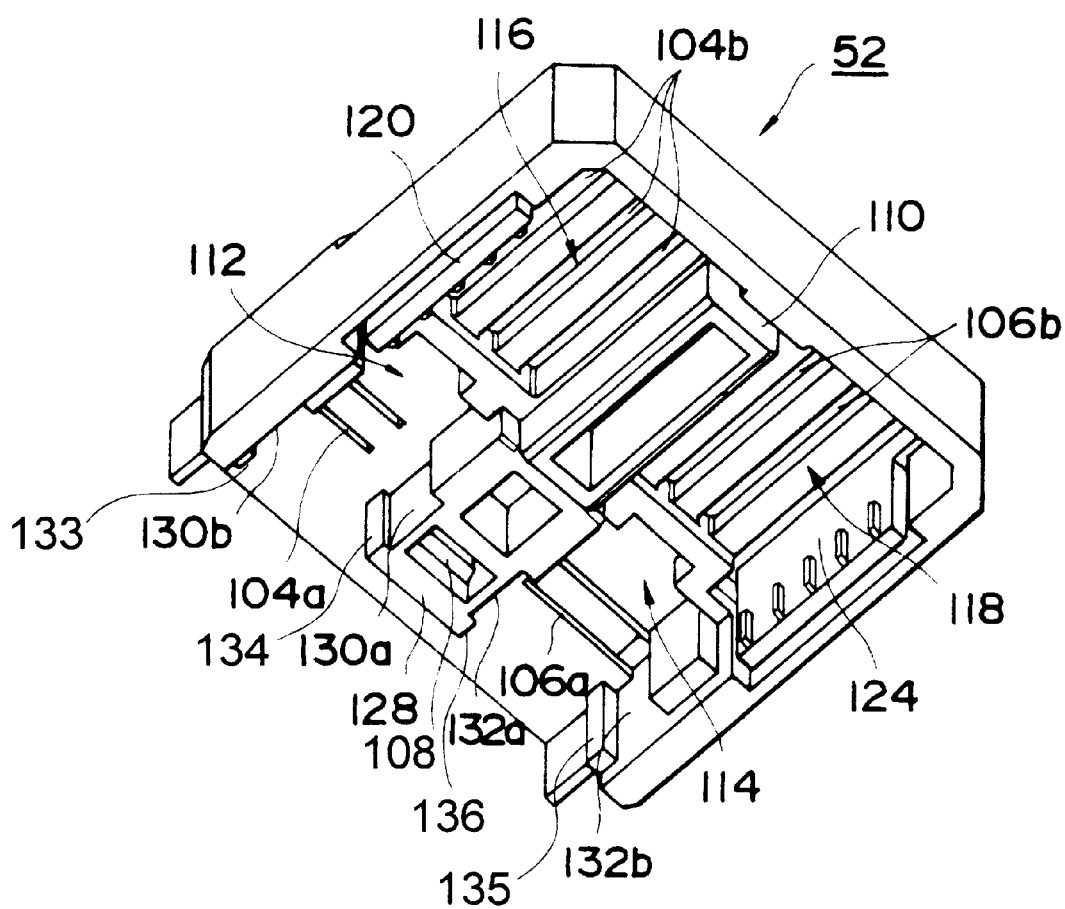
FIG. 19 is a perspective view showing an inner configuration of a main body upper part.

The main body upper part 52 is integrally molded with a liquid crystal polymer resin, and its configuration is substantially similar to that of the main body upper part 52 in the first embodiment shown in FIG. 8 or 12. The abutments in this embodiment, however, are structurally different from those in the first embodiment in that, as shown in FIG. 19, an abutment 120 for securing the outer lead pins 10 disposed on both sides of the receiving subassembly Rx by pressing them sidewise toward the guide grooves 62a of the main body lower part 50 and an abutment 124 for securing the outer lead pins 40 disposed on both sides of the transmitting subassembly Tx by pressing them sidewise toward the guide grooves 68a of the main body lower part 50 are formed.

Also, the top parts of cavities 116, 118 are made thicker, and the respective encapsulating portions 18, 48 of the subassemblies Rx, Tx are held between these top parts and the mounting tables 66, 72 provided in the main body lower part 50.

All the inner wall surfaces of the main body upper part 52 are coated with conductive plating such as copper (Cu) or nickel (Ni). The conductive plating has been formed by plating processing with such a thickness that it can directly be soldered, while being prevented from easily peeling off from its base, i.e., liquid crystal polymer resin.

Figure 20:
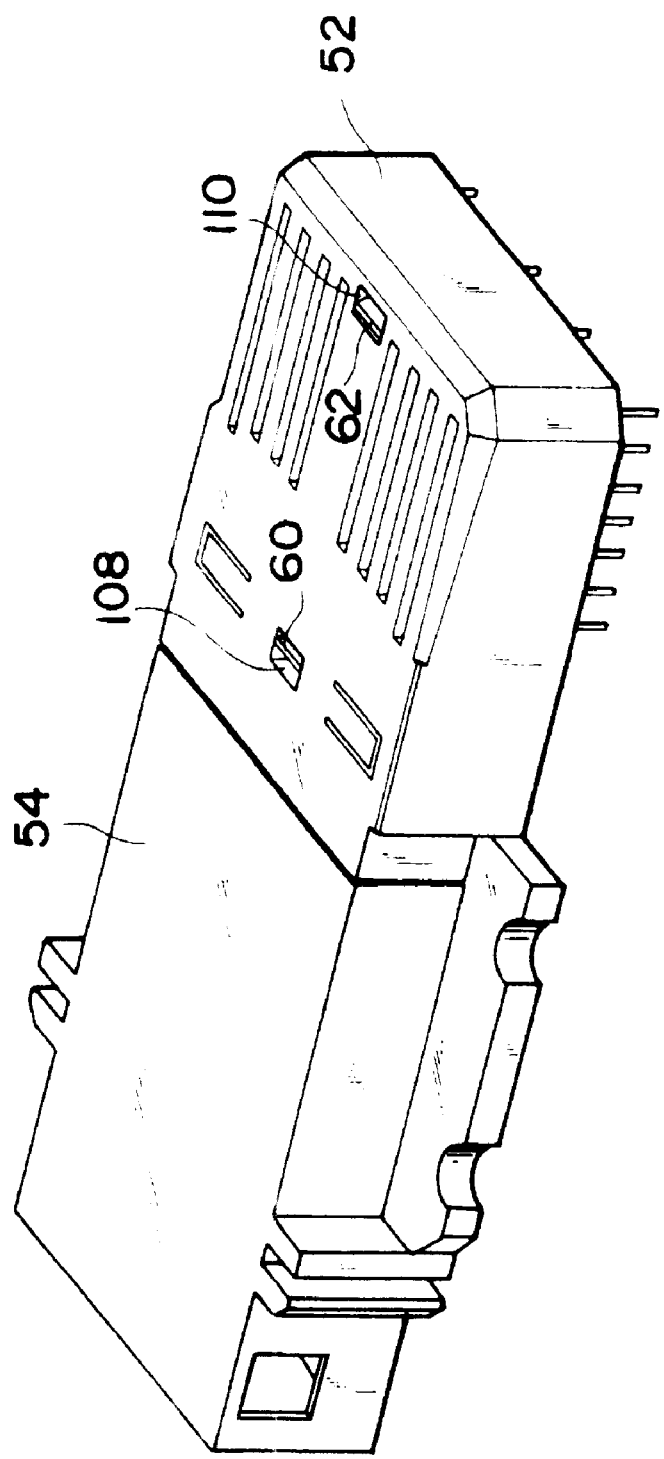
FIG. 20 is a perspective view showing an exterior configuration of the optical data link.

As shown in FIG. 20, the main body lower part 50 is covered with the main body upper part 52, and the pawls 60, 62 are inserted into their corresponding engagement holes 108, 110, whereby the pawls 60, 62 automatically mate with the engagement holes 108, 110 due to their counterforces, thereby accomplishing an optical data link having an integrated structure. When the pawls 60, 62 and the engagement holes 108, 110 are out of their engagement with each other, then the main body upper part 52 can easily be removed from the main body lower part 50.

Effects of the optical data link in accordance with this embodiment will now be explained.

In FIG. 18, when the main body upper part 52 is assembled to the main body lower part 50, then the inner wall of the main body upper part 52 comes into contact with the side walls 74, 76 on both sides of the main body lower part 50. Also, the abutments 120, 124 and the guide grooves 62a, 68b hold therebetween the outer lead pins at the ground potential so as to come into contact therewith. When the grounding outer lead pins in the outer lead pins 10, 40 are set to the ground potential, then the whole main body upper part 52 attains the ground potential, whereby the receiving subassembly Rx and the transmitting subassembly Tx can be shielded from external noise.

Since the optical receptacle section 54, which is subjected to mechanical stress when an optical connector is attached thereto or detached therefrom or when being secured to a printed board, is molded with a PPS (polyphenylene sulfide) resin having a high strength, while the main body lower part 50 and main body upper part 52, which are free of mechanical stress, are molded with a liquid crystal polymer resin, an optical data link having a mechanically strong structure can be realized. Also, since the main body lower part 50 and the main body upper part 52 are molded with a liquid crystal polymer resin which is easily coated with conductive plating, an excellent shielding effect is obtained. Hence, an optical data link having both excellent mechanical strength and excellent shielding effect with respect to external noise can be realized.

Since the optical receptacle section, which requires a dimensional accuracy and is subjected to mechanical strength, is molded with a polyphenylene sulfide resin, a sufficient dimensional accuracy and mechanical strength are obtained.

As the respective second encapsulating portions 18, 48 of the subassemblies Rx, Tx are held between the inner wall of the main body upper part 52 and the mounting tables 66, 72 of the main body lower part 50, their positional shifting in their lengthwise directions is suppressed. The effects of restraining the positional shifting in other directions and integration are similar to those in the first embodiment.

Though this embodiment relates to a case where the main body lower part 50 is molded with a liquid crystal polymer resin, it may be molded with a polyphenylene sulfide resin as well. Namely, the optical receptacle section 54 requiring dimensional accuracy and mechanical strength may be molded with a polyphenylene sulfide resin, the main body upper part 52 may be molded with a liquid crystal polymer resin since conductive plating is necessary in a large area thereof, and the main body lower part 50 may be molded with a liquid crystal polymer resin or polyphenylene sulfide resin since it is only necessary for at least the portion thereof electrically coming into contact with the main body upper part 52 to be coated with the conductive plating.

Figure 21:
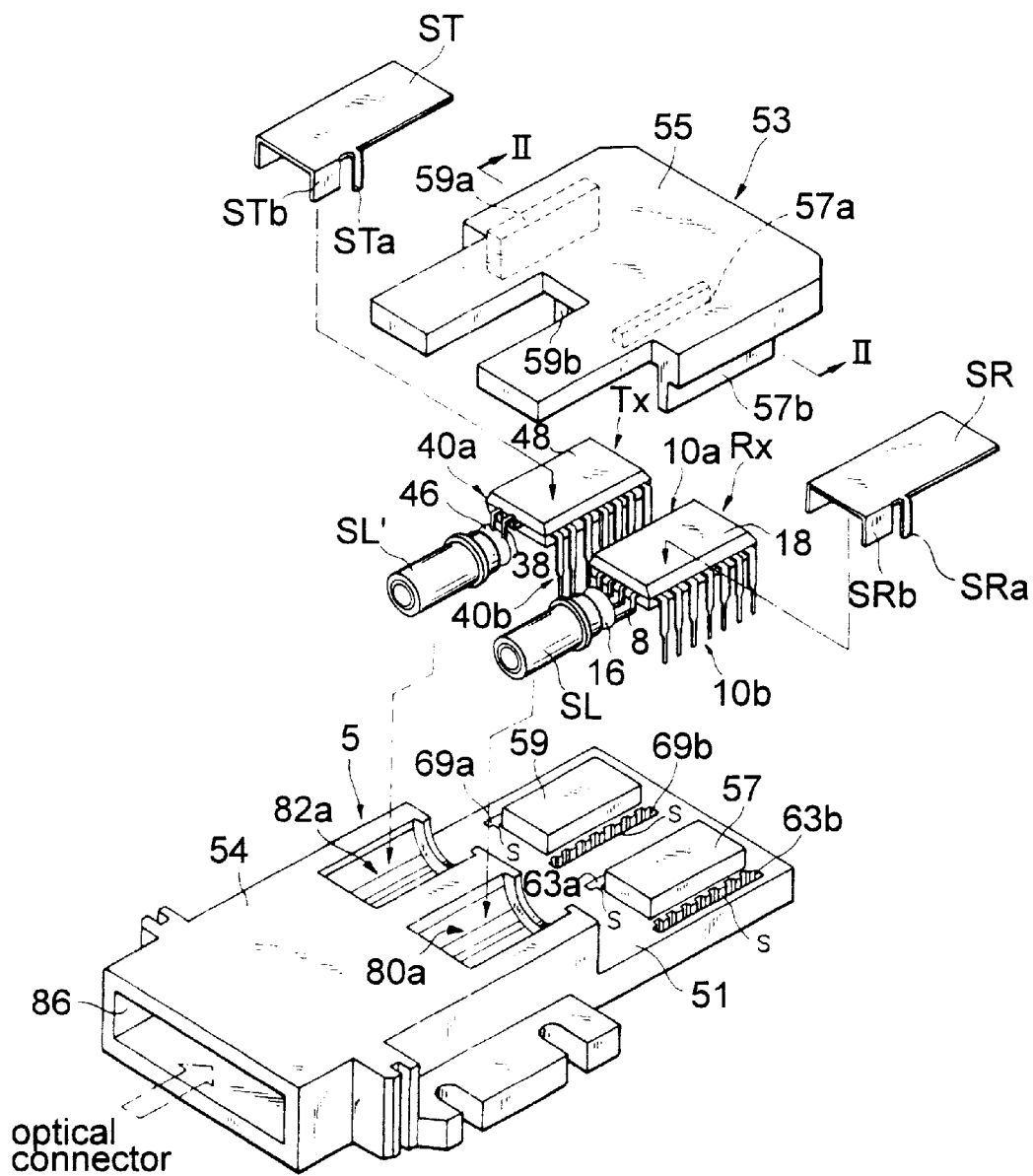
FIG. 21 is a perspective view showing a third embodiment of the optical data link in accordance with the present invention in an exploded state.
Figure 22:
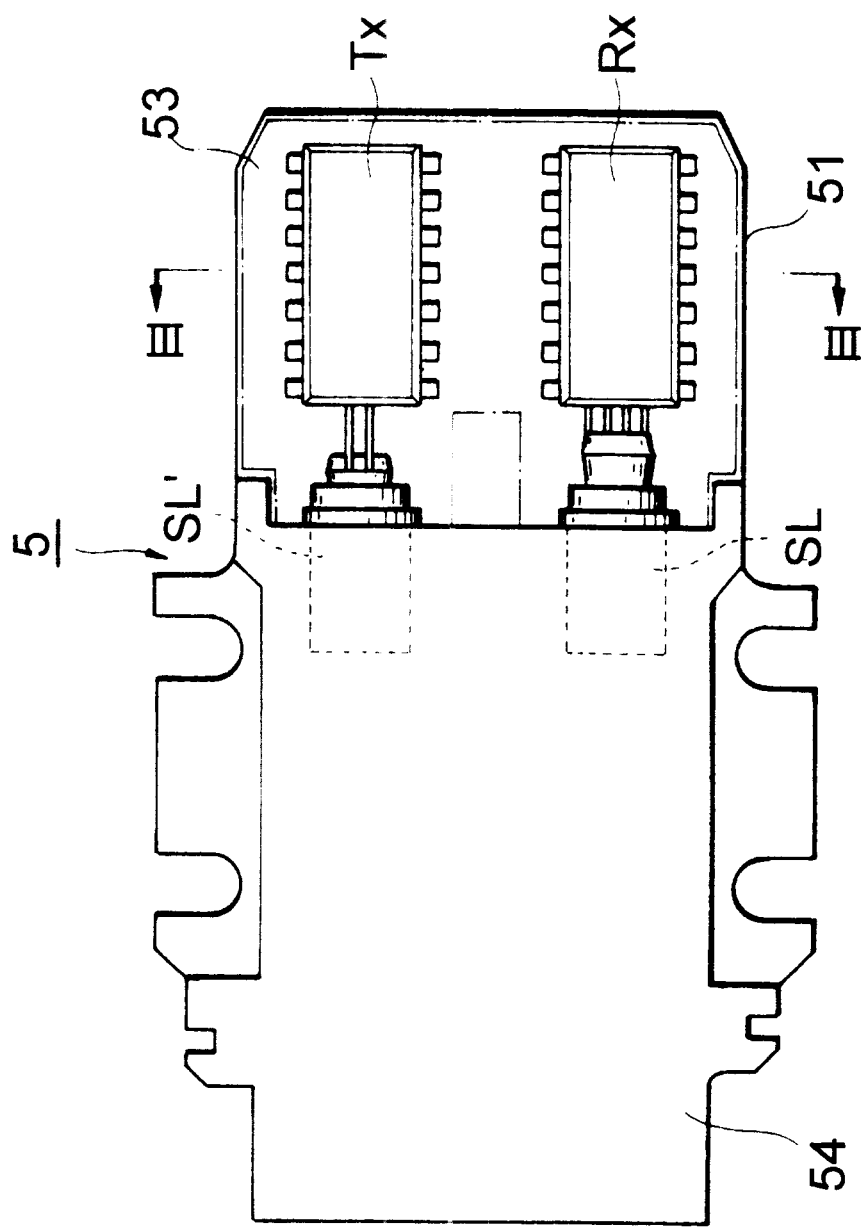
FIG. 22 is a plan view showing the optical data link in a partly perspective fashion.

A third embodiment of the optical data link in accordance with the present invention will now be explained. FIG. 21 is a perspective view showing the optical data link of this embodiment in an exploded state. FIG. 22 is a plan view showing a configuration of the optical data link in a partly perspective state.

In FIGS. 21 and 22, the optical data link is constituted by a housing 5 made of an optical receptacle 54 and a subassembly mount 51 which are integrally molded with a resin; and a transmitting subassembly Tx provided with a cylindrical alignment sleeve SL', a receiving subassembly Rx provided with a cylindrical alignment sleeve SL, shield members ST, SR made of a metal, and a resinmolded securing member 53 which are assembled thereto.

The optical receptacle 54 is formed with a mating hole 86 for mating with an optical connector with an optical fiber from the front side, and fitting mechanism 82a, 80a, formed on its upper part, communicating with the mating hole 86.

When assembling subassemblies Tx, Rx to the subassembly mount 51, the subassemblies Tx, Rx and optical fibers in the optical connector will automatically be aligned with each other in terms of optical axes if only the alignment sleeves SL', SL are attached to their corresponding fitting mechanisms 82a, 80a.

The subassembly mount 51 is formed with rectangular parallelepiped saddles 59, 57 for mounting dual inline package (DIP) type subassemblies Tx, Rx; a pair of elongated through holes 69a, 69b for receiving a plurality of outer lead pins 40a, 40b provided in the subassembly Tx, and a pair of elongated through holes 63a, 63b for receiving a plurality of outer lead pins 1a, 10b provided in the subassembly Rx.

The side wall portions of the through holes 69a, 69b nearer the saddle 59 are formed with a plurality of groove-like depressions S having forms and pitches corresponding to those of the outer lead pins 40a, 40b in the individual lines of the subassembly Tx. Similarly, the side wall portions of the through holes 63a, 63b nearer the saddle 57 are formed with a plurality of groove-like depressions S having forms and pitches corresponding to those of the outer lead pins 10a, 10b in the individual lines of the subassembly Rx.

When the subassemblies Tx, Rx are mounted across their corresponding saddles 59, 57, and their outer lead pins 40a, 40b; 1a, 10b are inserted into their respective through holes 69a, 69b; 63a, 63b, then the outer lead pins 40a, 40b; 10a, 10b are discretely and independently fitted into their corresponding depressions S so as to be positioned.

The shield members ST, SR are formed from thin metal flat sheets which are disposed such as to cover their corresponding subassemblies Tx, Rx and first encapsulating portions 46, 16. The flat sheets, at one end part thereof, are integrally formed with thin prongs STa, SRa extending substantially vertically downward, and frame portions STb, SRb bent like U such as to cover the first encapsulating portions 46, 16. The prong STa of the shield member ST is disposed at a position electrically coming into contact only with a grounding lead pin in the outer lead pins 40a, 40b in the subassembly Tx from the outside. In FIGS. 21 and 22, the prong STa is adapted to come into contact with the leftmost lead pin in the outer lead pins 40b. Similarly, the prong SRa of the shield member SR is disposed at a position coming into contact with a grounding lead pin (leftmost lead pin in the outer lead pins 10b) of the subassembly Rx.

Integrally molded in the securing member 53 are a top plate 55 for holding the shield members ST, SR between it and the second encapsulating portions 48, 18 of the subassemblies Tx, Rx, and vertical extensions 59a, 59b, 57a, 57b extending vertically downward from the lower end of the top plate 55.

Figure 23:
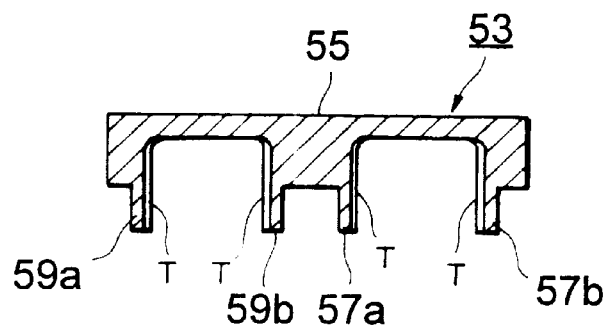
FIG. 23 is a sectional view showing a configuration of a securing member.

As shown in a vertical sectional view (see FIG. 23) taken along the virtual line II—II of FIG. 21, the vertical extensions 59a, 59b are separated from each other by a gap corresponding to the gap between the lines of outer lead pins 40a, 40b, so as to be inserted into their corresponding through holes 69a, 69b. The vertical extensions 57a, 57b are separated from each other by a gap corresponding to the gap between the lines of outer lead pins 1a, 10b, so as to be inserted into their corresponding through holes 63a, 63b.

As a consequence, the vertical extensions 59a, 59b are inserted into their corresponding through holes 69a, 69b in the state where the outer lead pins 40a, 40b of the subassembly Tx are held while the shield member ST is secured between the lower surface of the top plate 55 and the second encapsulating portion 48 of the subassembly Tx. The vertical extensions 57a, 57b are inserted into their corresponding through holes 63a, 63b in the state where the outer lead pins 10a, 10b of the subassembly Rx are held while the shield member SR is secured between the lower surface of the top plate 55 and the second encapsulating portion 18 of the subassembly Rx.

Further, the opposing surfaces of the vertical extensions 59a, 59b are formed with a plurality of protrusions T corresponding to the plurality of depressions S formed in the through holes 69a, 69b. Similarly, the opposing surfaces of the vertical extensions 57a, 57b are formed with a plurality of protrusions T corresponding to the plurality of depressions S formed in the through holes 63a, 63b.

Figure 24:
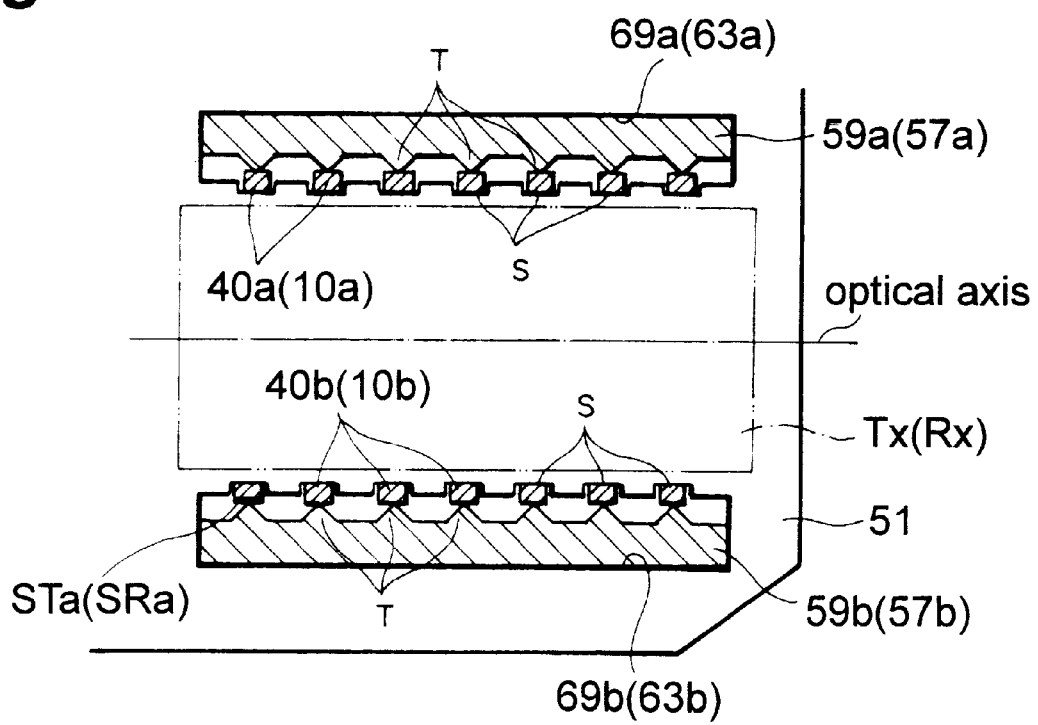
FIG. 24 is an explanatory view for explaining a structure for attaching a subassembly, the securing member and a shield member to through holes.

As mentioned above, when the subassemblies Tx, Rx and the shield members ST, SR are assembled to the securing member 55, and the vertical extensions 59a, 59b, 57a, 57b are inserted into their corresponding through holes 69a, 69b, 63a, 63b, then the outer lead pins 40a, 40b, 10a, 10b are discretely and independently fitted into their corresponding depressions S of the through holes 69a, 69b, 63a, 63b so as to be positioned therein and are secured therein as being pressed by the individual protrusions T of the vertical extensions 59a, 59b, 57a, 57b as shown in FIG. 24.

Also, the prongs STa, SRa of the shield members ST, SR are secured while being brought into electric contact with predetermined grounding lead pins by the protrusions T. Further, since the frame portions STb, SRb positioned in front of the prongs STa, SRa surround the first encapsulating portions 46, 16 from thereabove, shield effects are exhibited.

When assembling the subassemblies Tx, Rx, the shield members ST, SR, and the securing member 53 to the through holes 69a, 69b, 63a, 63b, the alignment sleeves SL', SL are simultaneously attached to their corresponding fitting mechanism 82a, 80a in the optical receptacle 54.

Figure 25:
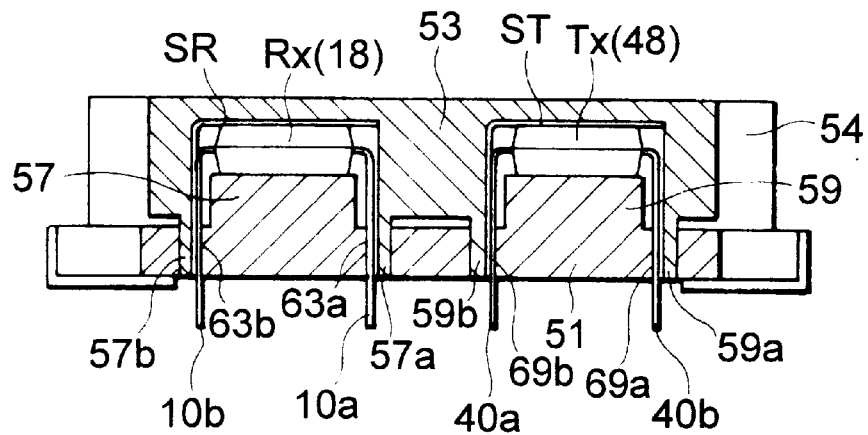
FIG. 25 is a sectional view showing a configuration of a part to which the subassembly is attached.

Thus, in accordance with this embodiment, as shown in a vertical sectional view (see FIG. 25) taken along the virtual line III—III of FIG. 22, if only the subassemblies Tx, Rx, the shield members ST, SR, and the securing member 53 are assembled, as an integral unit, to the fitting mechanisms 82a, 80a and the through holes 69a, 69b, 63a, 63b, then they can surely be secured to the housing 5 having the optical receptacle 54 and the subassembly mount 51, thereby allowing the manufacturing process to be simplified greatly.

Also, when each of these constituents is molded with geometrically predetermined dimensions and form, then, even after the completion of the optical data link, mechanical rattles can be prevented from occurring between the individual constituents, and an optical link having an excellent optical coupling efficiency can be obtained between the optical connector mating with the optical receptacle 54 and the subassemblies Tx, Rx.

In an actually manufactured optical data link, as the result of the attachment structure shown in FIG. 24 in which the subassemblies Tx, Rx were assembled into the through holes 69a, 69b, 63a, 63b having a plurality of depressions S with the aid of the securing member 53 in which the vertical extensions 59a, 59b, 57a, 57b are formed with a plurality of protrusions T corresponding to these depressions S, it was possible for the positional error A of each of the outer lead pins 40a, 40b, 10a, 10b to be held within the range of 0.23 mm.

Also, since the shield members ST, SR coming into contact with the grounding lead pins are provided, an excellent resistance to noise is exhibited. As shown in FIG. 24, the through holes 69a, 69b, 63a, 63b are not sealed with the outer lead pins 40a, 40b, 10a, 10b, the prongs STa, SRa of the shield members ST, SR, and the vertical extensions 59a, 59b, 57a, 57b of the securing members 53, but gaps are formed therein. As a consequence, this configuration is effective in that these gaps function as drain holes for detergent liquids when washing the optical data link. Also, since the alignment sleeves SL', SL are molded with a resin, a low-cost optical data link can be provided.

Figure 26:
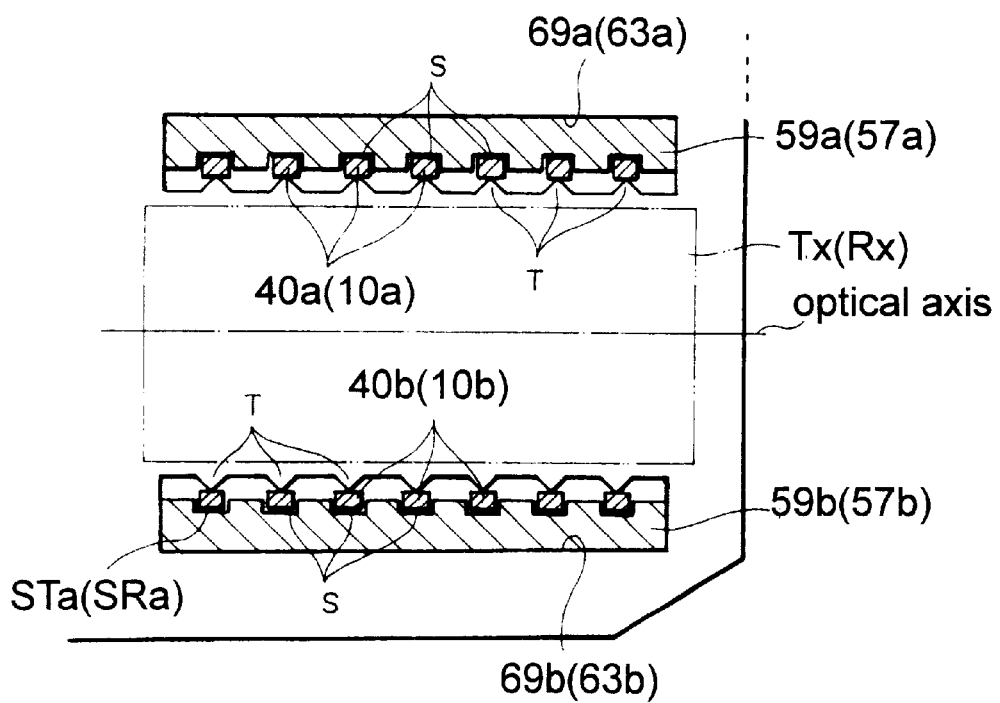
FIG. 26 is an explanatory view for explaining a modified example of the structure for attaching the subassembly, the securing member and a shield member to through holes.
Figure 27:
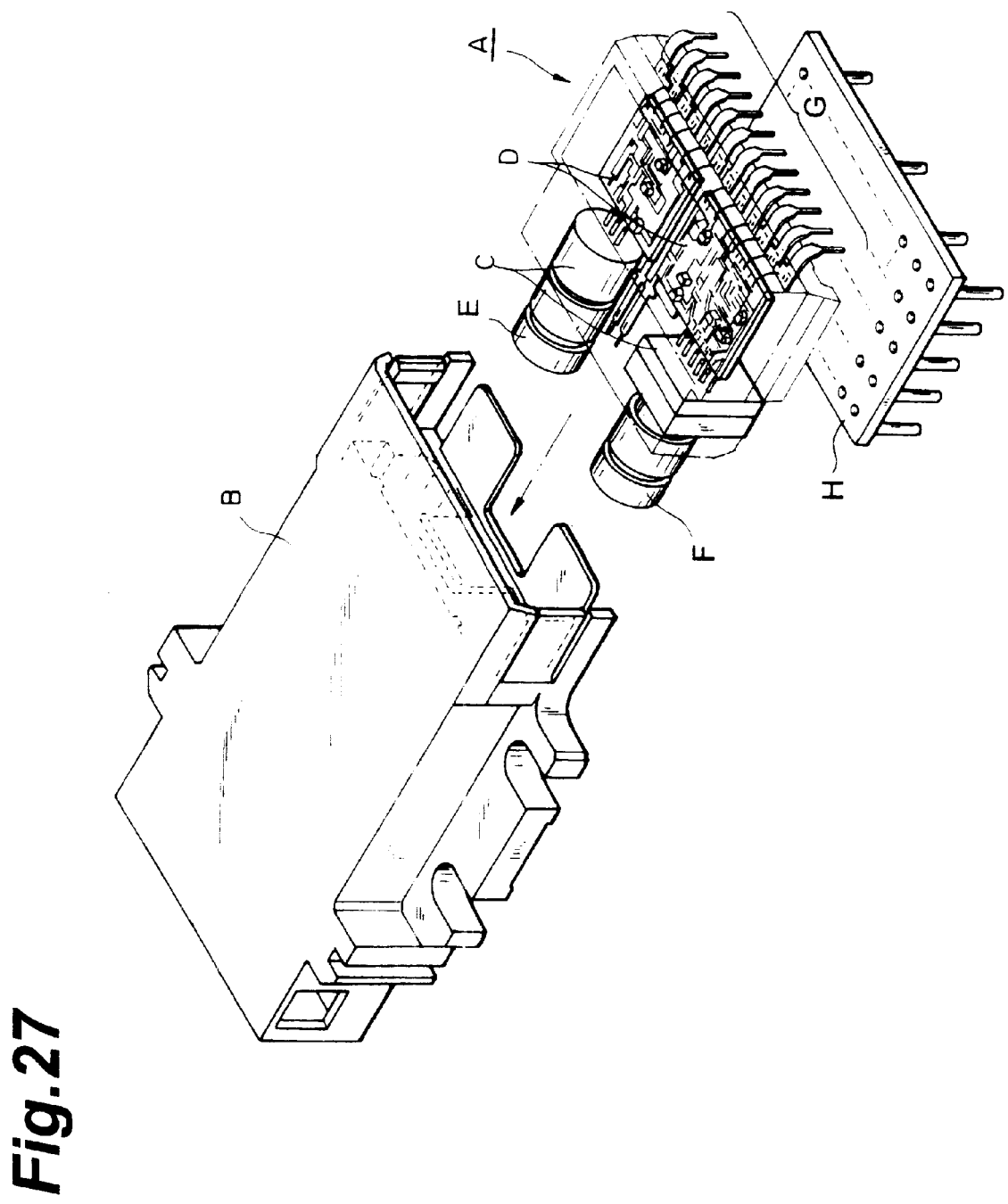
FIG. 27 is an exploded perspective view showing an example of configuration of a conventional optical data link.

Though the foregoing embodiment relates to a case where, as shown in FIG. 24, the side wall portions of the through holes 69a, 69b, 63a, 63b are formed with the depressions S while the vertical extensions 59a, 59b, 57a, 57b of the securing member 53 are provided with the protrusions T; a configuration shown in FIG. 26 may also be employed, in which a plurality of depressions S matching the outer lead pins 40a, 40b, 10a, 10b are formed in the vertical extensions 59a, 59b, 57a, 57b of the securing member 53, while the side wall portions of the through holes 69a, 69b, 63a, 63b are provided with a plurality of protrusions T corresponding to these depressions S, and the outer lead pins 40a, 40b, 1a, 10b and the prongs STa, SRa of the shield members ST, SR are held between the depressions S and protrusions T.

Though a configuration assembled with the shield members ST, SR is explained, the lower surface of the top plate 55 of the securing member 53 may be coated with metal plating, such that one end of the metal plating comes into electric contact with a grounding lead pin, so as to improve the resistance to noise.

Though the configuration in which the subassemblies Tx, Rx are secured with the single securing member 53 is explained, a securing member having the vertical extensions 59a, 59b and a securing member having the vertical extensions 57a, 57b may be provided separately from each other.

Without being restricted to the above-mentioned case where the respective lines of outer lead pins 40a, 40b, 10a, 10b are collectively inserted into their corresponding elongated through holes 69a, 69b, 63a, 63b, the subassembly mount 51 may be provided with discrete through holes for the respective outer lead pins, while the securing member 53 may be molded with comb-shaped vertical extensions 59a, 59b, 57a, 57b having the individual protrusions T or depressions S such as those shown in FIG. 24 or 26, and the individual tooth portions of the comb may be inserted into the discrete through holes, so that the outer lead pins 40a, 40b, 10a, 10b are individually positioned and secured.

Also, the configuration is not restricted to that explained here in which a plurality of depressions S and protrusions T are provided so as to position and secure the outer lead pins 40a, 40b, 10a, 10b therebetween such that they are prevented from dropping off. For example, the protrusions T may appropriately be thinned out relative to the depressions S. In this case, though the outer lead pins are positioned as mating with the depressions S, it is necessary for the number of protrusions T to be such that the mechanical rattles and dropout of subassemblies can be prevented from occurring when the optical data link is accomplished. Also, as another modified example, while a plurality of depressions S for mainly positioning the outer lead pins 40a, 40b, 10a, 10b are formed, their corresponding protrusion may be formed as at least one linear projection extending along the aligning directions of the outer lead pins 40a, 40b, 1a, 10b, and the outer lead pins 40a, 40b, 10a, 10b fitting into the depressions S may collectively be fastened and secured, line by line, by this linear projection.

Though the first to third embodiments relate to the attachment structures for DIP type subassemblies, the present invention is also applicable to cases for attaching single inline package (SIP) type subassemblies. Also, though an optical data link comprising both of the receiving subassembly Rx and transmitting subassembly Tx is explained, the present invention is also applicable to an optical data link comprising one of the receiving subassembly Rx and transmitting subassembly Tx.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical data link comprising a housing; and a communication subassembly, attached to said housing, having an optical device, wherein said housing is configured such that a plurality of outer lead pins provided in said communication subassembly are secured as being positioned while penetrating through said housing at predetermined positions;

said optical data link further comprising:
a through hole disposed at one end portion of said housing, for receiving a pluralitv of said outer lead pins provided in said communication subassembly and securing means for positioning and securing said plurality of outer lead pins at predetermined positions within said through hole.

2. An optical data link according to claim 1, wherein said housing comprises:
a main body lower part for mounting said communication subassembly;
a main body upper part adapted to engage said main body lower part; and
an optical receptacle section, secured to a front portion of said main body lower part, for mating with an optical connector accommodating an optical fiber.

3. An optical data link according to claim 1, wherein said communication subassembly is a receiving subassembly in which a light-receiving device for receiving an optical signal from an optical fiber and an electronic device for processing an output signal of said light-receiving device are encapsulated with a resin.

4. An optical data link according to claim 1, wherein said communication subassembly is a transmitting subassembly in which a light-emitting device for transmitting an optical signal to an optical fiber and an electronic device for supplying an electric signal to said light-emitting device are encapsulated with a resin.

5. An optical data link according to claim 3, wherein said receiving subassembly has an integrated structure comprising an optical device mounting section for mounting said light-receiving device, an electronic device mounting section for mounting said electronic device, and a lead frame having an inner lead pin for mechanically and electrically connecting said optical device mounting section and electronic device mounting section to each other, said integrated structure encapsulating said light-receiving device and electronic device discretely and independently from each other with a resin.

6. An optical data link according to claim 4, wherein said transmitting subassembly has an integrated structure comprising an optical device mounting section for mounting said light-emitting device, an electronic device mounting section for mounting said electronic device, and a lead frame having an inner lead pin for mechanically and electrically connecting said optical device mounting section and electronic device mounting section to each other, said integrated structure encapsulating said light-receiving device and electronic device discretely and independently from each other with a resin.

7. An optical data link according to claim 2, wherein:

said main body upper part is a conductive molded member;

said main body lower part has a conductive member whose all surfaces are conductive, and an insulating member made of a resin;

said conductive member has a conductive guide groove for coming into electric contact with and securing a grounding outer lead pin in said outer lead pins of said communication subassembly;

said insulating member has an insulating guide groove for securing an outer lead pin to which a predetermined voltage is applied or in which inputting or outputting of a signal is effected, in said outer lead pins of said communication subassembly; and at least one said conductive guide groove or at least one said grounding outer lead pin being formed such that an elastic deformation of said grounding outer lead pin keeps electric contact between said grounding outer lead pin and said conductive member, while said main body upper part and said conductive member being disposed in electric contact with each other, so as to constitute an electric shield covering said communication subassembly.

8. An optical data link according to claim 7, wherein said conductive member is made of a resin whose all surfaces are coated with conductive plating.

9. An optical data link according to claim 7, wherein said conductive member is made of a metal.

10. An optical data link according to claim 7, wherein at least one said conductive guide groove has a protrusion for elastically deforming said grounding outer lead pin so as to keep electric contact.

11. An optical data link according to claim 7, wherein at least one said grounding outer lead pin has a bent portion for keeping electric contact with said conductive guide groove.

12. An optical data link according to claim 2, wherein:

said optical receptacle section is molded with a polyphenylene sulfide resin;

said main body upper part is molded with a liquid crystal polymer resin coated with conductive plating; and said main body lower part is molded with a liquid crystal polymer resin or polyphenylene sulfide resin, a portion of said main body lower part mating with said main body upper part being coated with conductive plating.

13. An optical data link according to claim 12, wherein said communication subassembly comprises a grounding outer lead pin for coming into contact with said main body upper part, an inner wall of said main body upper part as a whole being coated with conductive plating, said grounding outer lead pin and said inner wall of said main body upper part coated with said conductive plating being adapted to come into electric contact with each other.

14. An optical data link according to claim 1, wherein said housing is integrally provided with an optical receptacle for mating with an optical connector so as to make said optical connector connect with said communication subassembly.

15. An optical data link according to claim 1, wherein said securing means comprises:

a plurality of depressions, formed at a side wall portion of said through hole provided in said housing, for mating with said plurality of outer lead pins discretely and independently from each other; and a member, assembled into said through hole, having at least one protrusion for fastening said plurality of outer lead pins mating with said depressions to a side wall of said depressions.

16. An optical data link according to claim 1, wherein said securing means comprises:

a member having a plurality of depressions corresponding to said plurality of outer lead pins, said member being adapted to mate with said plurality of outer lead pins discretely and independently from each other when assembled into said through hole formed in said housing; and at least one protrusion, formed at a side wall portion of said through hole, for fastening said plurality of outer lead pins inserted into said depressions of said member to a side wall of said depressions.

17. An optical data link according to claim 15, further comprising a shield plate made of a metal covering said communication subassembly, one end portion of said shield plate being held between said member and a grounding lead pin in said plurality of outer lead pins.

18. An optical data link according to claim 15, in which a side wall of said member facing said communication subassembly is coated with metal plating covering said communication subassembly, one end portion of said metal plating being in electric contact with a grounding lead pin in said plurality of outer lead pins.

* * * * *